United States Patent
Lewis et al.

(12) 
(10) Patent No.: US 6,233,565 B1
(45) Date of Patent: *May 15, 2001

(54) METHODS AND APPARATUS FOR INTERNET BASED FINANCIAL TRANSACTIONS WITH EVIDENCE OF PAYMENT

(75) Inventors: Richard Lewis; Tara Dwyer, both of New York; Mohammed Abdelsadek, Rego Park; Donald Han, Flushing, all of NY (US); Jonathon Rogoff, Chicago; Louis Parks, Highland Park, both of IL (US)

(73) Assignee: Saranac Software, Inc., Syracuse, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/023,724

(22) Filed: Feb. 13, 1998

(51) Int. Cl.[7] .................. G06F 17/60; H04L 9/00
(52) U.S. Cl. .................. 705/35; 705/26; 705/39; 705/40; 705/44; 380/9; 380/23; 380/24; 380/25; 380/49
(58) Field of Search ............ 705/26, 35, 39–40, 705/42, 44; 380/23–25, 30, 37, 49

(56) References Cited

U.S. PATENT DOCUMENTS

| | | |
|---|---|---|
| 4,097,923 | 6/1978 | Eckert Jr. et al. . |
| 4,436,992 | 3/1984 | Simjian .................. 235/381 |
| 4,447,890 | 5/1984 | Duwel et al. . |

(List continued on next page.)

FOREIGN PATENT DOCUMENTS 0 735 719 A2  10/1996  (EP) .................. H04L/9/08

(List continued on next page.)

*Primary Examiner*—James P. Trammell
*Assistant Examiner*—Cuong H. Nguyen
(74) *Attorney, Agent, or Firm*—Orrick, Herrington & Sutcliffe LLP

(57) ABSTRACT

A system and methods for conducting Internet based financial transactions between a client and a server. The client has a processor, a printer, a client authentication module, a module for issuing a transaction request, and a unique digital signature. The server has a network including a transaction server, a transaction database, a server authentication module, and a receipt generation module. An internet connection is used between the client and the server network. The transaction execution system includes authentication, wherein the client authentication module and the server authentication modules communicate via the internet connection and are authenticated to each other. A transaction module is included wherein, in response to the client and server being authenticated, the client issues a transaction request to the server and the transaction server, in response to a client transaction request, executes an electronic payment transaction at the server and records the transaction in the transaction database. The server receipt generation module, in response to an executed electronic payment, then generates a receipt and transmits the receipt to the client. The receipt includes the client digital signature and a data set uniquely identifying the executed transaction and is printable by the client printer. The printed receipt is an evidence of payment for the executed transaction. In addition, a third party seller having a processor and a database can be connected via a communication channel to the server, wherein the client further obtains a registration certificate representative of being a consumer registered with said third party seller. A third party credit facility also may be connected via a communication link to the server, for implementing credit card transactions. The transaction execution system may be to purchase an amount of postage, to purchase a ticket for air travel or to an entertainment complex or the like.

18 Claims, 11 Drawing Sheets

U.S. PATENT DOCUMENTS

| | | | |
|---|---|---|---|
| 4,725,718 | 2/1988 | Sansone et al. | 235/495 |
| 4,743,747 | 5/1988 | Fougere et al. | 235/494 |
| 4,757,537 | 7/1988 | Edelmann et al. | 380/51 |
| 4,760,534 | 7/1988 | Fougere et al. | |
| 4,774,500 | 9/1988 | Lichty | 341/95 |
| 4,775,246 | 10/1988 | Edelmann et al. | 380/23 |
| 4,802,218 | 1/1989 | Wright et al. | 380/23 |
| 4,812,994 | 3/1989 | Taylor et al. | |
| 4,825,053 | 4/1989 | Caile | 235/380 |
| 4,831,566 | 5/1989 | Matthews et al. | |
| 4,837,701 | 6/1989 | Sansone et al. | |
| 4,853,865 | 8/1989 | Sansone et al. | |
| 4,853,961 | 8/1989 | Pastor | 380/21 |
| 4,855,920 | 8/1989 | Sansone et al. | |
| 4,864,618 | 9/1989 | Wright et al. | 380/51 |
| 4,873,645 | 10/1989 | Hunter et al. | |
| 4,900,903 | 2/1990 | Wright et al. | 235/380 |
| 4,900,904 | 2/1990 | Wright et al. | 235/381 |
| 4,901,241 | 2/1990 | Schneck | |
| 4,907,161 | 3/1990 | Sansone et al. | |
| 4,949,381 | 8/1990 | Pastor | 380/51 |
| 4,969,381 | 11/1990 | Decker, Jr. et al. | 84/291 |
| 4,998,204 | 3/1991 | Sansone et al. | |
| 4,999,481 | 3/1991 | Baer et al. | 235/375 |
| 5,077,792 | 12/1991 | Herring | 380/24 |
| 5,111,030 | 5/1992 | Brasington et al. | 235/375 |
| 5,142,577 | 8/1992 | Pastor | 380/21 |
| 5,181,245 | 1/1993 | Jones et al. | 380/23 |
| 5,185,243 | 2/1993 | Ullman et al. | 435/6 |
| 5,200,903 | 4/1993 | Gilham | |
| 5,202,834 | 4/1993 | Gilham | |
| 5,224,046 | 6/1993 | Kim et al. | |
| 5,233,531 | 8/1993 | Schutz | |
| 5,233,657 | 8/1993 | Günther | 380/23 |
| 5,243,654 | 9/1993 | Hunter | 380/51 |
| 5,257,196 | 10/1993 | Sansone | |
| 5,257,197 | 10/1993 | Güther et al. | |
| 5,309,363 | 5/1994 | Graves et al. | |
| 5,319,562 | 6/1994 | Whitehouse | |
| 5,323,323 | 6/1994 | Gilham | |
| 5,341,505 | 8/1994 | Whitehouse | |
| 5,357,563 | 10/1994 | Hamilton et al. | 379/91 |
| 5,369,258 | 11/1994 | Sansone et al. | 235/381 |
| 5,375,172 | 12/1994 | Chrosny | 380/51 |
| 5,377,268 | 12/1994 | Hunter | 380/23 |
| 5,387,783 | 2/1995 | Mihm et al. | 235/375 |
| 5,448,641 | 9/1995 | Pintsov et al. | 380/51 |
| 5,452,203 | 9/1995 | Moore | |
| 5,454,038 | 9/1995 | Cordery ey al. | 380/23 |
| 5,457,636 | 10/1995 | Sansone et al. | |
| 5,480,239 | 1/1996 | Kim et al. | 400/120.09 |
| 5,510,992 | 4/1996 | Kara | |
| 5,513,112 | 4/1996 | Herring et al. | |
| 5,535,279 | 7/1996 | Seestrom | 380/55 |
| 5,570,465 | 10/1996 | Tsakanikas | |
| 5,583,779 | 12/1996 | Naclerio et al. | |
| 5,583,970 | 12/1996 | Strobel | |
| 5,586,036 | 12/1996 | Pintsov | |
| 5,598,477 | 1/1997 | Berson | 380/51 |
| 5,602,742 | 2/1997 | Solondz et al. | |
| 5,602,921 | 2/1997 | Ramadei | 380/51 |
| 5,606,507 | 2/1997 | Kara | |
| 5,606,613 | 2/1997 | Lee et al. | 380/21 |
| 5,612,889 | 3/1997 | Pintsov et al. | |
| 5,666,284 | 9/1997 | Kara | 705/402 |
| 5,666,421 | 9/1997 | Pastor et al. | 380/51 |
| 5,671,146 | 9/1997 | Windel et al. | |
| 5,682,318 | 10/1997 | Kara | |
| 5,682,429 | 10/1997 | Cordery et al. | 380/25 |
| 5,717,597 | 2/1998 | Kara | |
| 5,742,683 | 4/1998 | Lee et al. | 380/23 |
| 5,774,886 | 6/1998 | Kara | 705/410 |
| 5,778,076 | 7/1998 | Kara et al. | 380/51 |
| 5,781,438 | 7/1998 | Lee et al. | |
| 5,781,634 | 7/1998 | Cordery et al. | 380/25 |
| 5,796,834 | 8/1998 | Whitney et al. | 380/25 |
| 5,801,364 | 9/1998 | Kara et al. | 235/375 |
| 5,801,944 | 9/1998 | Kara | |
| 5,812,991 | 9/1998 | Kara | 705/410 |
| 5,819,240 | 10/1998 | Kara | 705/408 |
| 5,835,087 | * 11/1998 | Herz et al. | 345/327 |
| 5,850,446 | * 12/1998 | Berger et al. | 705/26 |
| 5,889,863 | * 3/1999 | Weber | 705/26 |

FOREIGN PATENT DOCUMENTS

| | | | |
|---|---|---|---|
| 0 735 720 A2 | 10/1996 | (EP) | H04L/9/08 |
| 0 735 721 A2 | 10/1996 | (EP) | H04L/9/08 |
| 0 735 722 A2 | 10/1996 | (EP) | H04L/9/08 |
| 0 762 692 A2 | 3/1997 | (EP) | H04L/9/32 |
| 0 780 804 A2 | 6/1997 | (EP) | G07B/17/02 |
| 0 780 806 A2 | 6/1997 | (EP) | G07B/17/02 |
| 0 780 807 A2 | 6/1997 | (EP) | G07B/17/02 |
| 0 782 108 A2 | 6/1997 | (EP) | G07B/17/02 |
| 0 780 109 A2 | 7/1997 | (EP) | G07B/17/02 |
| 0 782 110 A2 | 7/1997 | (EP) | G07B/17/02 |
| 0 782 111 A2 | 7/1997 | (EP) | G07B/17/02 |
| 0 782 112 A2 | 7/1997 | (EP) | G07B/17/04 |
| 0 782 113 A2 | 7/1997 | (EP) | G07B/17/04 |
| 0 811 955 A2 | 12/1997 | (EP) | G07B/17/04 |
| 0 814 434 A2 | 12/1997 | (EP) | G07B/17/02 |
| 0 825 566 A2 | 2/1998 | (EP) | G07B/17/00 |
| WO 97/15903 | 5/1997 | (WO) | G07B/17/00 |
| WO 98/11716 | 3/1998 | (WO) | H04N/1/44 |
| WO 98/14907 | 4/1998 | (WO) | B07B/17/00 |
| WO 98/14908 | 4/1998 | (WO) | G07B/17/00 |

\* cited by examiner

METHODS AND APPARATUS FOR INTERNET BASED FINANCIAL TRANSACTIONS WITH EVIDENCE OF PAYMENT

FIELD OF THE INVENTION

The present invention is directed towards electronic financial transactions between a customer having a personal computer (PC) and a remote service provider via the Internet, more particularly between a large plurality of customer PCs ("clients") and a remote service provider ("server"), wherein each transaction is digitally signed by the originator and is executed by the remote server, and a unique evidence of payment for the transaction is provided to the customer.

BACKGROUND OF THE INVENTION

The inventors have recognized that there exists a Small Office/Home Office ("SOHO") business segment market which is driven largely by "immediate gratification" and cost sensitivity. That is, the entrepreneurs who comprise this market are more inclined to utilize a product or service if it can be accessed quickly with a minimum of red tape. There is a strong inclination for people in this market to place a very high premium on their own time and that of their employees, such that products that improve their efficiency are of great value.

The inventors also have recognized that, in the SOHO market and elsewhere, postage application and Visits to the post office to purchase postage and/or ship envelopes and packages are seen as burdensome, time consuming and inefficient, and thus represent productivity opportunities—that is, opportunities to improve productivity by increasing efficiency. Similarly, use of other common carrier package delivery services, such as UPS, Federal Express, Purolator, etc., present similar productivity opportunities to expedite delivery of such services. For example, Federal Express has developed "power shipping", a service which uses a more efficient airbill printing system, but which requires installation of a Federal Express terminal and printer at the customer's site. However, this level of efficiency is reserved for substantial customers and is not available to the SOHO market; it also requires special hardware devices to implement and is limited to Federal Express packaging only.

A product or service that can be remotely accessed in real time would be highly valued by SOHO (and non-SOHO) businesses whose livelihoods depend on access to electronic marketing methods worldwide.

The Metering Technology Management Office of the United States Postal Service ("USPS") has announced plans and issued regulations for a personal computer ("PC") based system for selling postage to individual customers under the Information Based Indicia Program ("IBIP"). See, for example, IBIP Host System Specification (Oct. 9, 1996), IBIP Postal Security Device Specification (Jun. 13, 1996), IBIP Indicium Specification (Jun. 13, 1996), IBIP Key Management Plan (Apr. 25, 1997), USPS Domestic Mail Manual, Issue 50 (Jul. 1, 1996), Federal Register, Part V, 39 CFR Parts 111 and 501 (Jun. 9, 1995), FIPS PUB 140-1 (January 1994), FIPS PUB 180-1 (Apr. 17, 1995), FIPS PUB 186 (May 19, 1994). The IBIP program products and services represent a significant paradigm shift from the traditional postage meter technology and processes in which the customer has custody of a device, the postage meter, and must take it or some part of it to the postal service office to purchase and refill the meter with more postage.

Protecting the security of the mails, United States postage funds, and the funds of the individual user and electronic commerce are of great importance. Improved apparatus and methods for providing such postal service transactions are desirable.

It is, therefore, an object of the present invention to provide customer (client) to remote service provider (server) electronic transactions which are secure and reliable.

It is another object to present a significant paradigm shift, building and improving upon current IBIP modeling, and to provide a software-only product utilizing the Internet, conventional and security (encryption) technology and a unique form of evidence of payment for executing secure electronic transactions.

It is another object of the invention to provide products for using electronic commerce payment technologies as well as new approaches to old challenges (e.g., increased efficiency in scheduling and delivery of packages and mail in electronic commerce that is secure and traceable).

SUMMARY OF THE INVENTION

The present invention concerns a virtual product that exists in an electronic, non-physical realm. More particularly, it is directed to an application which can be downloaded from the Internet, extracted from a zip file, installed, accessed by a pre-registered user on a secure PC, and used to conduct electronic commerce.

Broadly, the invention concerns a system for electronic commerce including at least one user and a remote service provider, an Internet connection between each user and the remote service provider, wherein the user first becomes a registered user, e.g., registering with the remote service provider or with a third party supplier of goods and/or services or both, thereby obtaining a password set, and thereafter executes electronic transactions with the remote service provider using the password set to authenticate the user as a registered user and the remote service provider as an authentic service provider, and receives a secure evidence of payment for each transaction executed including a digital signature and data uniquely identifying the transaction.

In one embodiment, such a system may be implemented as follows. The system software is resident on a proprietary website of a remote service provider (hereinafter referred to synonymously as "RSP") and used to conduct commerce electronically with reliable security and confirmation, namely, evidence of payment. The RSP may sell services on its own account or act as a transaction intermediary between the customer and a third party seller ("TPS") that is offering the goods and/or services that the customer wishes to buy. The potential customer and user first registers and requests a license. The potential registrants are preferably licensed by the ultimate provider of the goods or services that will be purchased, for any of a number of reasons, including recordkeeping, billing, shipment, scheduling, warranty, etc., which may be the TPS or the RSP. In the case of the preferred embodiment, the user is licensed by the TPS which is the United States Postal Service and which has established USPS specifications for licensing individual customers. Other "postal" services such as the Royal Mail of the UK, or a shipping company such as UPS or Federal Express and the like, also may have certain licensing procedures. Licensing or registration with the TPS may be as simple as obtaining a unique account number, or more complex as involving credit checks, references and collateralizations, as the case may be. In certain cases, a license from the TPS is not required and can be omitted, or a license may be available from the RSP for security reasons. The customer's license is then registered with the RSP and sent to the customer via regular mail.

The customer and potential user then uses the provided account information to download the appropriate portion of the system software (also referred to as the "client" software) from the RSP. The potential user then installs the client software on a local PC type device and configures the software and hardware of the system for use including establishing a transaction database specific to the user. This database may include a Register indicating purchases or funds available or the like. The system also provides for authenticating the user to the RSP and the RSP to the user before any transaction can occur.

After authentication is completed, the user then purchases the ultimate goods or services, postage in the case of the preferred embodiment, utilizing credit cards, ACH debit cards or checks as the method of payment, and electronically confirming the sale. The RSP then operates on the user's transaction database, e.g., increments a "descending" register, associated with the specific user corresponding to postage purchased by the user. The transactional database for the user is maintained by the RSP and uses special transactional software, which for postage is referred to as a Postal Security Device (PSD) software, resides on a server of the RSP, and manages the accounting, auditing, and security, digitally signing each transaction to identify uniquely both the user and the transaction. The special transaction software also manages the printing at the user of evidence of payment of the purchase, e.g., postage, postage corrections, and refunds, and other miscellaneous communications with the RSP as appropriate and the TPS of goods or services, in the case of the preferred embodiment the United States Postal Service. Should there be a problem with the authentication process, the RSP server would disable the descending register and report the failure to the appropriate USPS authority, e.g., the National Meter Accounting and Tracking System ("NMATS"). Should there be a problem with the user's registration/license or should fraud be detected, e.g., detecting the same evidence of payment more than one time, the RSP server would disable the descending register and report the failure to NMATS. Should the user wish to terminate use of the product, the client software locally downloaded can be automatically uninstalled, disabling and rendering inoperable all aspects of the system software for the user. Uninstalling the client software would result in revocation of the customer's license. This revocation will be reported to the appropriate authority, e.g., the Centralized Metering Licensing System ("CMLS"). Any subsequent use of the "retired" password or account numbers by that or any other user constitutes fraud, which is detectable.

In an alternative embodiment, the transaction also may be digitally signed by the RSP executing the transaction, as well as by a TPS who provides the goods or services, thereby uniquely identifying the transaction in more detail.

Another aspect of the present invention is directed to a postal purchase system. One such system includes, for each customer, a client system and a Postal Secure Device (PSD) as defined by the IBIP specifications. The client system is a Host which resides on the customer's local PC and is responsible for the following: mailing list management, capturing postal purchase and refund request information, and providing an interface to the local printer producing the postal indicia. Each customer's PSD resides at a RSP "server" site and can be accessed only via the Internet. The customer's PSD is responsible for managing ascending and descending registers which track postal transactions, and creating a digital signature for each postal indicium produced by the customer on the local printer. By keeping all PSD functionality on a remote, central station server/network, all cash and key management and process auditing can be centralized and secured.

One embodiment of a system for conducting Internet based financial transactions including:

a client having a processor, a printer, a client authentication module, a module for issuing a transaction request, and a unique digital signature;

a server having a network including a transaction server, a transaction database, a server authentication module, and a receipt generation module; and an internet connection between the client and the server network;

wherein the transaction execution system further comprises:

an authentication module, wherein the client authentication module and the server authentication modules communicate via the internet connection and are authenticated to each other;

a transaction module wherein, in response to the client and server being authenticated, the client issues a transaction request to the server and the transaction server, in response to a client transaction request, executes an electronic payment transaction at the server and records the transaction in the transaction database, and wherein the server receipt generation module, in response to an executed electronic payment, generates a receipt and transmits said receipt to the client, said receipt comprising the client digital signature and a data set uniquely identifying the executed transaction; and wherein the receipt is printable by the client printer and the printed receipt is an evidence of payment for the executed transaction.

In one embodiment, the module for issuing a transaction request further comprises a means for providing the transaction request with the client digital signature, and the server further comprises a unique digital signature and the receipt further comprises the server digital signature.

The server may include a first server, a firewall and a single TCP/IP port, such that the first server is connected to the internet connection, the firewall is interposed between the first server and the transaction server and the transaction server is connected to the network through the single TCP/IP port. In this embodiment, the firewall comprises a communication module that operates to limit communications between the internet and the transaction server to client transaction requests identifying the single TCP/IP port.

Preferably, the system also includes a third party seller having a processor and a database, and a communication channel between the third party seller and the server, wherein the client further comprises a registration certificate representative of being a consumer registered with said third party seller. In such a system, a transaction module is provided and the third party seller database is updated by said server transaction database.

In an alternate embodiment, the system optionally may include a third party credit facility and a communication link between the third party credit facility and the server, wherein the server has a credit module and, in response to a suitable client transaction request, a credit card payment request is made by the server to the third party credit facility, the third party credit facility authorizes the credit card payment and issues an authorization code to the server, and the server transaction database is appropriately updated.

In an alternate embodiment of the system, the transaction request may include a request to purchase an amount of postage, an addressee data set, and wherein the server transaction database further comprises a pool of postage prepaid by said server, and an account register associated with said client, wherein the client transaction request operates to transfer the requested amount of postage from said pool to said client account register.

Regarding authentication, the client may have a client public key, a client private key, and a client identification password, a hash module for performing a hash algorithm based on an input data, a hash of at least one of the client public key, private key and identification password, and an encryption/decryption module for encrypting and decrypting at least one of the client private key and client public key based on said hash. Similarly, the server may have a server public key, a server private key, and a server identification password, a hash module for performing a hash algorithm based on an input data, a hash of at least one of the server public key, private key and identification password, and an encryption/decryption module for encrypting and decrypting at least one of the server private key and server public key based on said hash. Thus, the authentication module utilizes the public and private keys of said client and server to perform the authentication.

Another aspect of the invention is directed to a method for conducting Internet based financial transactions. One such method includes:

(a) providing a client having a processor, a printer, a client authentication module, a module for issuing a transaction request, and a unique digital signature;

(b) providing a server having a network including a transaction server, a transaction database, a server authentication module, and a receipt generation module;

(c) connecting the client to the server network via an internet connection;

(d) authenticating the client and the server to each other;

(e) issuing a transaction request from the client to the server;

(f) in response to a client transaction request, executing an electronic payment transaction at the transaction server and recording the transaction in the transaction database, generating a receipt at the server receipt generation module, providing said receipt with the client digital signature and a data set uniquely identifying the executed transaction, and transmitting said receipt to the client; and (g) printing said receipt using the client printer, wherein the printed receipt is an evidence of payment for the executed transaction.

In one embodiment, step (e) includes providing the transaction request with the client digital signature, step (b) includes providing the server with a unique digital signature, and step (f) includes providing the server digital signature as a part of the receipt.

In a preferred embodiment, step (b) includes providing a single TCP/IP port connecting the first server to the internet connection with the client and limiting communications between the internet and the transaction server to client transaction requests identifying the single TCP/IP port.

Preferably, the method includes providing one or both of a third party seller and a third party credit facility, connected to enable the client to issue a request to purchase an item from the third party seller, e.g., and payment may be by a credit instrument.

In a preferred embodiment, step (d) includes providing the client with a client public key, a client private key, a client identification password, a hash module for performing a hash algorithm based on an input data, a hash of at least one of the client public key, private key and identification password, and an encryption/decryption module for encrypting and decrypting at least one of the client private key and client public key based on said hash; providing the server a server public key, a server private key, a server identification password, a hash module for performing a hash algorithm based on an input data, a hash of at least one of the server public key, private key and identification password, and an encryption/decryption module for encrypting and decrypting at least one of the server private key and server public key based on said hash; and using said public and private keys of said client and server to perform the authentication.

BRIEF DESCRIPTION OF THE DRAWINGS

Other characteristics, features, and advantages of the present invention will appear to a person of ordinary skill in the art, in view of the following detailed description, made with reference to the accompanying drawings, in which like reference characters refer to like elements, and in which.

DETAILED DESCRIPTION OF THE DRAWINGS

Figure 1:
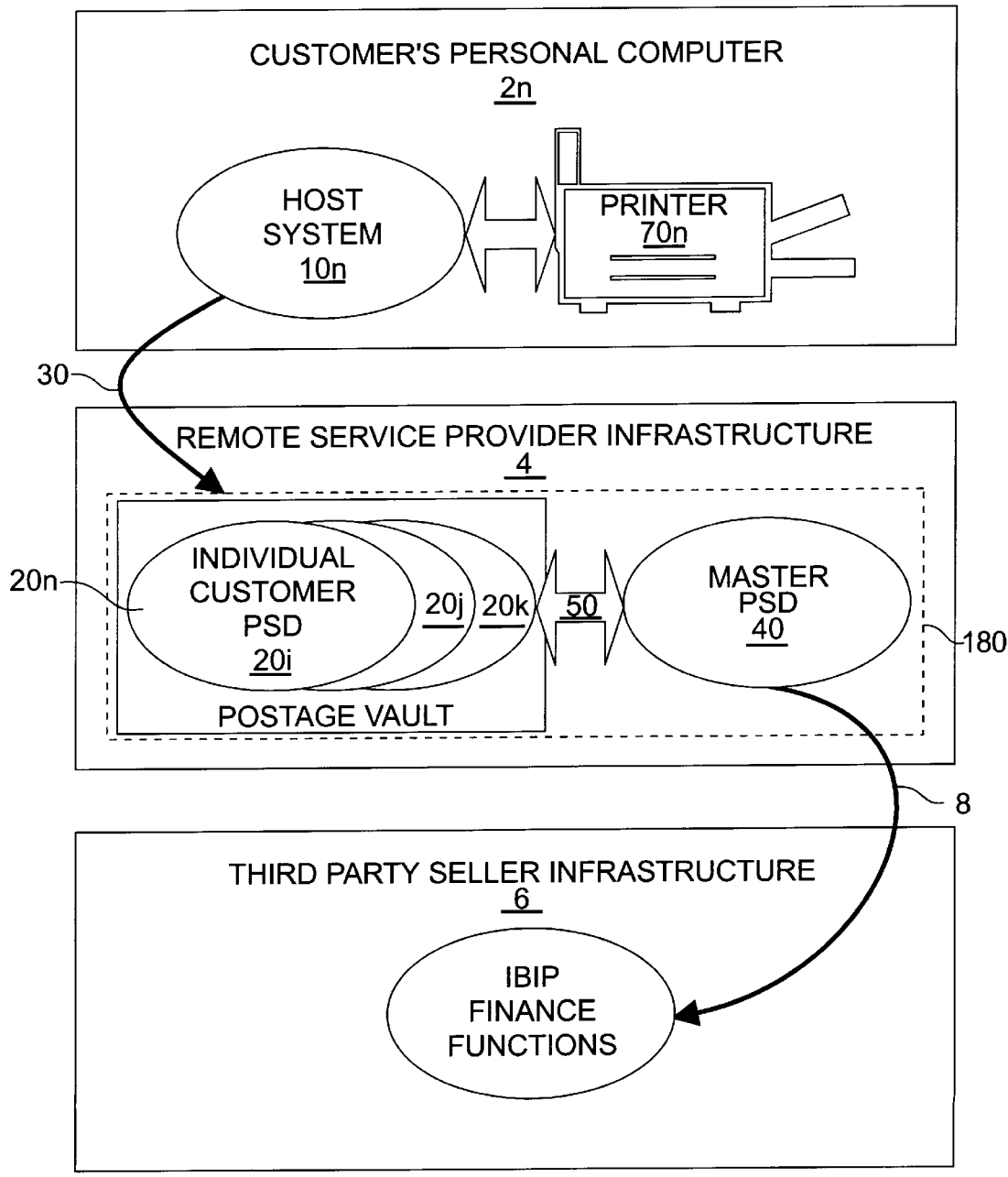
FIG. 1 is a block diagram of an architecture of an Internet-based transaction system in accordance with a preferred embodiment of the present invention.

FIG. 1 illustrates a system including a customer (also referred to as a "client") 2n, a remote service provider (RSP) 4, and a third party seller of goods and/or services (TPS) 6. The letter "n" is used as a suffix to indicate "one of a plurality of n" such that there may be a plurality of n clients "2" in the system, but the discussion is generally for each client and extends to all clients, although not necessarily identically for each client. The client 2n has a Host system 10n and a PSD 20n which is resident on a server of RSP 4. The Host 10n accesses the remote PSD 20n via the Internet 30.

FIG. 1 also shows the relationship between a plurality of individual PSDs 20n, where n=i, j and k corresponding to three different hosts 10i, 10j, and 10k and customers 2i, 2j, 2k respectively, and a single master PSD 40. The master PSD 40 is responsible for all cash management functions with the TPS server/network 6. In the preferred embodiment, the TPS 6 is the IBIP infrastructure as defined by the U.S. Postal Service IBIP specifications, and the master PSD 40 maintains a "pool" of postage with which the individual PSDs 20n transact business.

Customer 2n transactions occur between the customer's PSD 20n and the master PSD 40 over a secure bus 50, at RSP 4. Postage purchase transactions and funds flow occur between the master PSD 40 and the Computerized Meter Resetting System ("CMRS") infrastructure 60 of the United States Postal Service Treasury (the "Treasury") as referenced in the published CMRS specifications, IBIP Postal Security Device Specification Jun. 13, 1996, referred to herein as IBIP Finance infrastructure or TPS 6, by a private network connection 8. Each customer 2n also has a local printer 70n associated with each Host 10n for printing the postage indicium and reports as will be described.

The infrastructure of the RSP (or "server") 4 is preferably designed to address the following goals: (1) It will meet all Level 2 security requirements as defined in the aforementioned FIPS 140-1 and FIPS 186 specification, except for physical security because the transaction server(s) 180 on which the PSDs 20n and Master PSD 40 reside will exist on a protected segment behind a firewall 160 (see FIG. 2). Security measures are used to ensure that the transaction server 180 is physically accessed by highly trusted and authorized individuals only; (2) It will be scalable from zero to two million customers (n, n=1 to $2 \times 10^6$ customers); (3) Customer Host 10n requirements are a personal computer ("PC") with a 486 processor or higher, 8 Megabytes of RAM, a hard drive with at least 10 Megabytes of space available, a modem (9600 BPS or higher), a printer (laser, inkjet, or bubblejet), running preferably Windows95™, a web browser software, and an active Internet connection; (4) Non-print electronic transactions should be performed in less than five seconds; and (5) Print electronic transactions should be completed within thirty seconds.

Figure 2:
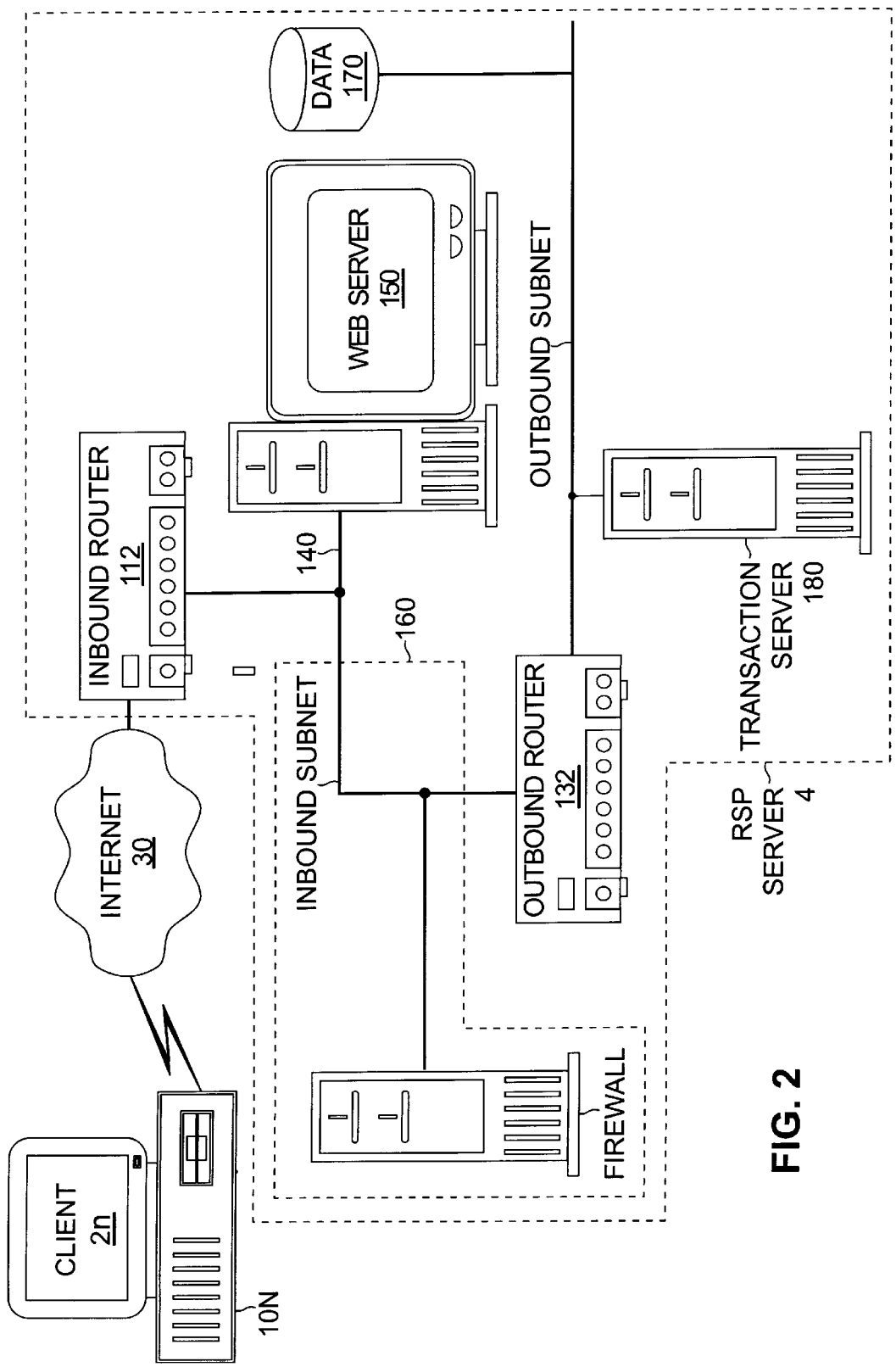
FIG. 2 is a high level diagram of an architecture of FIG. 1.

Referring to FIG. 2, the infrastructure of RSP 4 can be broken down into several pieces: (1) A web server 150 that is used by customers for registration and client software download and is the apparent website; (2) A transaction server(s) 150 that serves as the transactional link between the customer's Host PC 10n and all RSP 4 functions; and (3) A series of database servers 170 that perform all of the RSP 4-related and TPS 6-required functions.

Referring also to FIG. 2, to protect the various components from unauthorized access and intrusion, the PSP 4 is provided with an inbound network 110 and an outbound network 130. The inbound network 110 allows a customer 2n to securely access the RSP web server 150. The outbound network 130 allows for the secure exchange of financial transactions executed between the customer 2n and the TPS 6 directly and/or indirectly through RSP 4. Network traffic in and out of these networks is controlled by a conventional inbound router 112 and an outbound router 132, which will operate to filter out all unauthorized traffic. In addition, a firewall 160 will be used on the inbound and outbound segments to examine each data packet transmitted for proper authorization. The secured portion of the RSP web server 150, i.e, that portion which is access protected by passwords to authorized/registered users, will exist on a unique port 140 so that only traffic identifying that specific port 140 will be accepted. The transaction server(s) 180 will exist on a unique internet protocol ("IP") address(es) so that the outbound router 132 can filter out all traffic except to that address. The transaction server 180 will also be configured to handle IP traffic only. The outbound router 132 and the firewall 160 will filter out all other Internet protocols according to industry standards for such firewalls. The PSP 4 also includes a series of data servers 170 (shown collectively in FIG. 2) that will be responsible for various dedicated functions. As the transaction server 180 receives a transaction request, the type of transaction is identified and processed using one of these servers as identified in the Table I below.

TABLE I

Transactions

| | | | Server Actions | | | | |
|---|---|---|---|---|---|---|---|
| Transaction Type | Transaction Server 190 | Master Server 300 | Payment Server 190 | Log Server 195 | Postage Server 450 | Customer Server 460 | Credit Auth. Server 400 |
| Authentication client 2n to server | 1. Verify client Signature 2. Decrypt client request 3. Request customer lookup 4. Decipher message 5. Validate customer 6. Send digitally signed and ciphered message | 1. Provide customer public key 2. Send Transaction Summary to Log Server | | 1. Log Transactions | | Provide customer information | |
| Purchase of Good/services e.g., postage | 1. Verify digital; Signature of client 2. Decrypt client Request 3. Send purchase | 1. Increment customer PSD ascending register 2. Send Transaction Summary to Log Server | Manage Purchase Process | 1. Log Transactions 2. Send Log to TPS (IBIP Infrastructure) | 1. Decrement Master descending register 2. Request postage from TPS (USPS) 3. Increment Master | | 1. Issue check request 2. Receive response 3. Send response to Purchase Server |

TABLE I-continued

Transactions

| Transaction Type | Transaction Server 190 | Master Server 300 | Payment Server 190 | Log Server 195 | Postage Server 450 | Customer Server 460 | Credit Auth. Server 400 |
|---|---|---|---|---|---|---|---|
| | Request to Payment Server<br>4. Digitally Sign and Encrypt Response<br>5. Send ciphered message to client | | | | descending register<br>4. Send Transaction Summary to Log Server | | |
| Refund | 1. Verify client Signature<br>2. Decrypt client Request<br>3. Send Request to Payment Server<br>4. Digitally sign and Encrypt Response<br>5. Send digitally signed and ciphered message to client | 1. Increment customer PSD ascending register<br>2. Send Transaction Summary to Log Server | Manage Refund Process | 1. Log Transactions<br>2. Send Log to TPS (IBIP Infrastructure) | 1. Decrement Provider PSD ascending register<br>2. Send Transaction Summary to Log Server | 1. Issue credit check request<br>2. Receive response<br>3. Send response to Purchase Server | |
| Print | 1. Verify client Signature<br>2. Decrypt client Request<br>3. Send Request to Payment Server<br>4. Digitally sign and Encrypt Response<br>5. Send ciphered message to client | 1. Decrement customer PSD ascending register<br>2. Send Transaction Summary to Log Server | 1. Create Indicia<br>2. Create file: of Indicia<br>3. Notify Transaction Server | 1. Log Transactions<br>2. Send Log to IBIP Infrastructure | | | |
| Address Change | 1. Verify client Signature<br>2. Decrypt client Request<br>3. SendRequest to Customer Server | | | 1. Log Transactions<br>2. Send Log to IBIP Infrastructure | | 1. Update Customer Record<br>2. Send Transaction Summary to Log Server | |
| Address Cleanse | 1. Verify client Signature<br>2. Decrypt client Request<br>3. SendRequest to Customer Server<br>4. Digitally sign and Encrypt Response<br>5. Send ciphered message | | | 1. Log Transactions<br>2. Send Log to TPS (IBIP Infrastructure) | | 1. Cleanse Addresses<br>2. Create file of addresses<br>3. Notify Transaction Server<br>4. Send Transaction Summary to Log Server | |

Scalability is maintained by allowing for multiple servers, particularly for the transaction 180, payment 190, and log 195 servers (multiple servers not shown). These servers will process the highest volumes of traffic because all transactions will pass through them.

Preferably, various other software manufacturers will be able to develop and/or access both the printing and transaction management pieces of the system through a controlled set of Application Program Interfaces (API) for each customer 2n to operate the system using a conventional word processing or x-window motif program and the downloaded client software.

Registration and Acquisition

In one preferred embodiment, each customer 2n goes through a sequence of steps to ensure that the customer has been licensed and authorized to produce postage and that use of the Host system 10n can be strictly monitored.

Figure 6A:
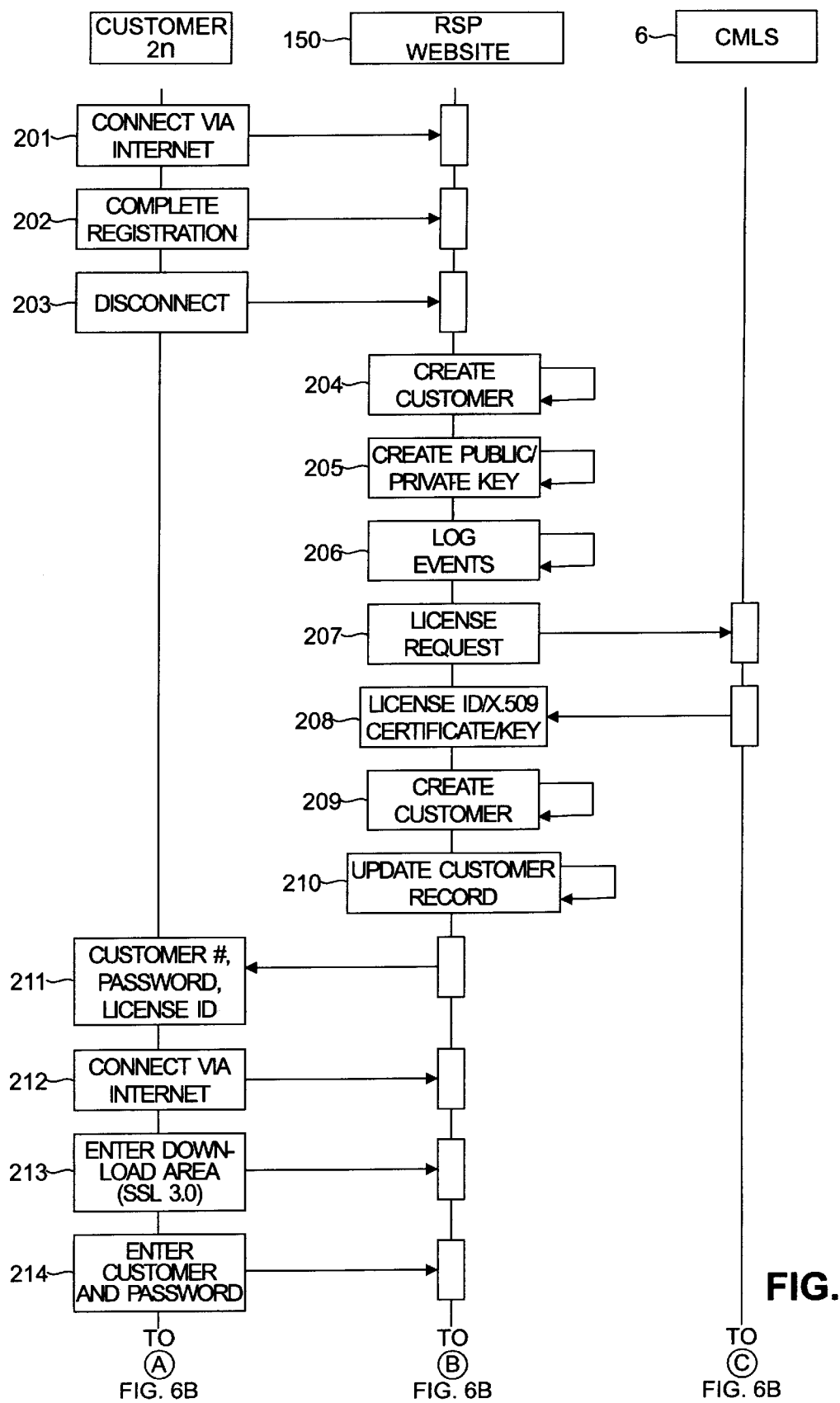
FIGS. 6A and 6B are a block diagram of an authentication process for use in the present invention.
Figure 6B:
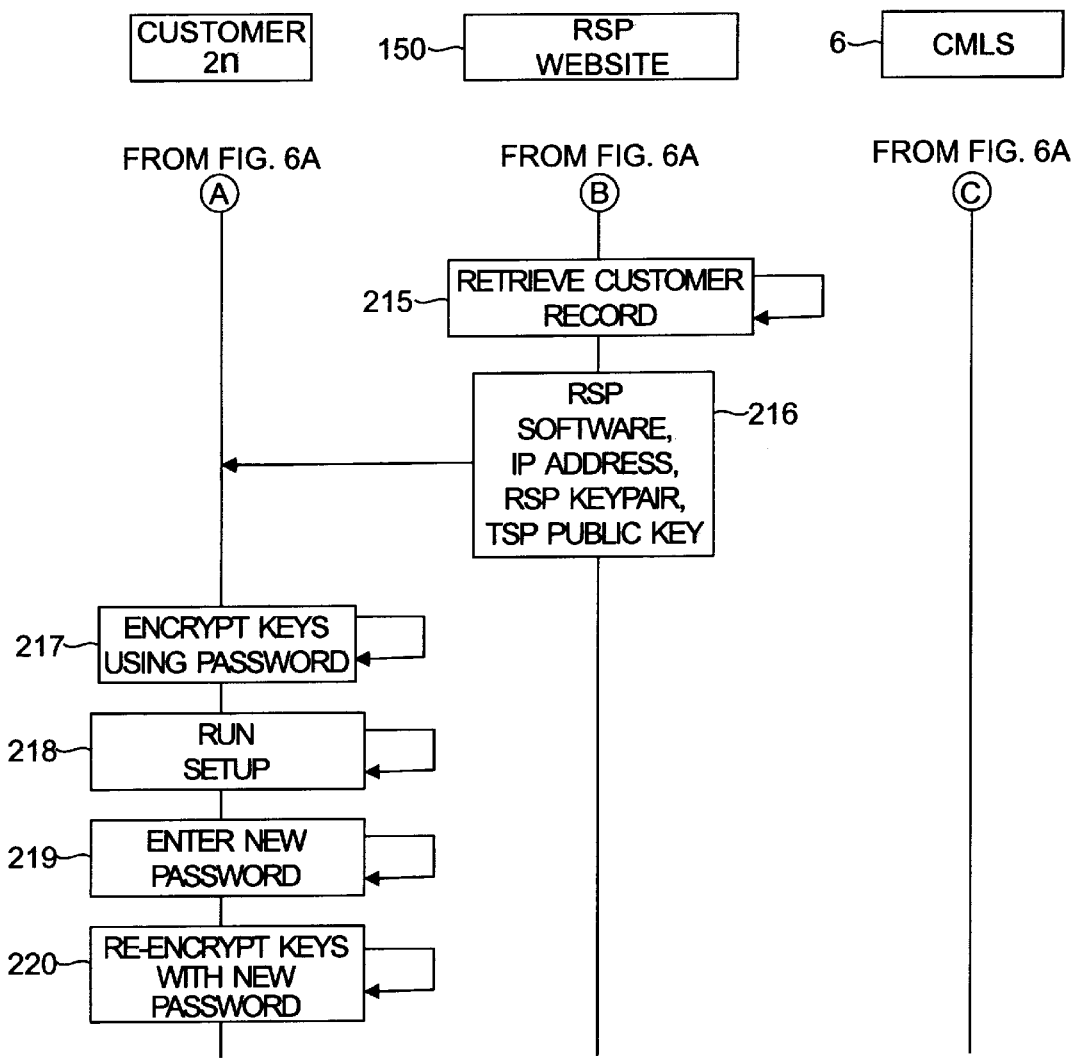

With reference to FIG. 6, one such sequence of steps include the following.

At step 201, the customer 2n uses the Internet browser software and an Internet 30 to connect to the web site server 150 of RSP 4. At step 202, the customer 2n fills out a registration form, e.g., an on-line form that collects the information necessary to register/license the customer. In the preferred embodiment, the user electronically fills out a Postal Service Form 3601-A application, to enable the customer to purchase postage electronically.

At step 203, the customer 2n logs off, and at step 207, the RSP's web server 150 transmits the completed application to TPS 6 (e.g., IBIP Finance Infrastructure, also called CMLS). At step 204, web server 150 creates a customer and at step 205 creates a public key and a private key pair for the customer record, and at step 206 a log of events for the customer is created.

At step 208, TPS 6 returns a "license" number to Web Server 150, which recreates a customer record at step 209 and updates the record at step 210.

At step 211, web server 150 generates a letter electronically, containing the customer's new Customer Number, the License Number, and a Password set. This letter is ported to a suspense file for someone to execute. The letter is then executed and delivered to the customer via regular mail. An alternate mode of conveying this customer specific information may be used, e.g., encrypted e-mail, voice or facsimile transmission.

At step 212, after receiving the letter, the customer uses its Internet browser again to connect to the RSP web server 150. The customer selects a SOFTWARE DOWNLOAD option at step 213, and is prompted for the customer number and password to enter the secured area of web server 150 at step 214. Once the customer password and identification is entered and verified, at step 215 the web server 150 retrieves the previously stored customer record. At step 216, the customer then downloads the client software program for operating the system, the internet protocol address for postal transactions, the public key/private key pair for the RPS 4, and the public key for TPS 6.

Using the client software, the customer's private key is encrypted using the password and stored at step 217, and then SETUP is run at step 218. SETUP extracts the client software; installs it on the client hard disk; updates the Windows® registry; and updates Word™ (or comparable word processing program) templates.

For enhanced security, the customer then enters a new password at step 219 and reencrypts the customer public key, private key pair with the new password at step 220.

Certificate

During the Registration process, the web server 150 obtains and forwards the appropriate information to TPS 6, e.g., the United States Postal Service Certifying Authority for issuance of the user's certificate ("X.509") as required by Postal Service specifications. Preferably, the issuance of the Postal User Certificate X.509 from the United States Postal Service Certifying Authority will be accomplished in as near to real time as possible, because generally a postage value download to the user's PSD 20n will not be permitted without an authenticated certificate.

With reference again to FIG. 3 and to FIG. 6, after receiving the certificate and a license/registration number at step 216, the user 2n can then proceed to make a purchase, e.g., of postage. User 2n makes a purchase through a proprietary connection over the Internet 30 using the appropriate IP address as provided by the downloaded client software to connect with the RSP's Internet transaction server 180, utilizing a suitable form of payment, such as credit cards, electronic funds transfer, ACH debit cards, or checks.

Electronic payments are reported to the transaction server 180 which then transmits them to a specified financial institution for deposit. Upon receipt back of an authorization code, transaction server 180 then increments the user's descending register 21 in PSC 20n with the correct amount. The ascending and descending registers of each user 2n are stored on the Master Server 300 at RSP 4. Under current Postal Service guidelines, the total maximum amount permitted in the descending register 21 is $500.00, but any value could be used, as well as no limit at all.

Checks used to pay for postage are preferably sent by the user 2n to a designated lockbox institution for processing in a conventional manner. When a user's check has cleared, the lockbox institution transmits an electronic authorization to the transaction server 180, which operates to transmit a notice to the user 2n of postage availability. The user 2n typically must then access the transaction server 180 to obtain the postage (which may have already been allocated to the user 2n and held in a suspense server 310) and server 180 operates the master server 300 to increment the user's descending register 21n in PSD 20n by the proper amount and clear the register in suspense server 310.

In accordance with a preferred embodiment, a "pool" of postage preferably is purchased by PSP 4 from the TPS 6, i.e, United States Postal Service, and maintained in the master PSD 40 by the RSP 4. Postage is added to this pool when required (e.g., when purchased by PSP 4 or by decrementing the user's descending register 21n when the system software is uninstalled, returned, or otherwise credited), and is decremented when necessitated.

Indicium

One of the advantages of the present invention is that postage can be purchased and effectively downloaded to the local printer 70 of the user 2n where it is printed onto an envelope or label as a virtual postage stamp. This virtual postage stamp is referred to as an "intelligent indicia 74" or more simply "indicia 74" and is evidence of payment for the postage that is locally printed and directly applied onto envelopes or labels via a printer 70n. See FIGS. 4A and B. Indeed, envelopes and labels can be printed singly, that is one at a time, or in a batch, or in groups as from a mailing list.

The Log Server 195 stores all data used for reporting, both internally to PSP 4 and to the TPS 6. The Log Server 195 also performs all audit functions. Results of these audits will be made available to TPS 6 and in the case of the postage embodiment, to various USPS agencies, as indicated in FIG.

2 as data management module 42 in PSP 4 and data management module 62 in TPS 6.

As noted, the master server 300 maintains a pool of postage and its own supply of cash from which refunds are given. It is desired in the postage system embodiment that there be two types of refunds: full and partial. The refunds can be transacted by one of two methods: electronic or manual. Partial refunds are given for spoilage and similar reasons, including the destruction of downloaded indicia, typically prior to printing, due to customer hardware or client software failures. Full refunds are given to customers when the system client software is uninstalled. Electronic refunds are given when the user 2n has established an electronic payment pattern. Since the PSD 20n and all relevant customer information is maintained on the master server 300, no refunds will need to be given for failures or disk crashes in the Host system 10n.

The client software portion of the system installed and resident on the hard drive in the PC of user 2n functions as the Host system 10n. The software encompasses a variety of functions, some of which are: maintenance of registration information for obtaining a user's license from the TPS 6 (postal service); printing of, e.g., a postal/service lease agreement; integration with existing word-processing applications for an API to print postage, e.g., when printing the envelope for a letter or a label for a package; processing of mailing lists; implementation of ZIP+4 address cleansing (hygiene); calculation of postage by mail-piece according to established postage rate tables; formatting of a mail-piece for proper printing; printing mail-piece on standard printers, e.g., in a Windows™ environment; and collection of purchase and refund request information. It is believed that it is within the abilities of a person of ordinary skill in the art to create client software instructions and APIs suitable to implement some or all of the foregoing functions as a matter of design choice.

A portion of the system software resident on the transaction server 180 of RPS 4 functions as the Postal Secure Device (PSD) 20n. This software portion, known as the Transaction Manager, encompasses many features and benefits to both the TPS 6 (e.g., United States Postal Service) and customers, as illustrated by Table II.

TABLE II

| Function/Feature | USPS Benefit | Customer Benefit |
| --- | --- | --- |
| Secure purchase and storage of postage | Secure revenue stream | Protection of postage purchase |
| Creation of authorized indicia | Fraud detection, improve efficiency of mailstream | Efficient mail preparation and application |
| Logging and reporting all indicia | Ability to track postage purchases and detect fraud; ability to detect variations in mail flow (volume of mail, by piece count and weight) to schedule sufficient resources to collect and deliver mail | Tracking of postage costs and their allocation within company |
| Processing of refund requests | Positive customer support and cash management system | Ability to recover funds lost through spoils, etc. |
| Processing of license cancellations and revocations | Ability to track postage application population | Expedient processing |
| Fraud detection and postal service notification | Revenue protection | Detect theft or misuse of product by unauthorized users |

The system of the present invention can be considered as a combination of several components or modules which include: UI (user interface), Security, Printing, Financial Transactions, Communications, and Database Management. Each of these is designed to be in compliance with industry standards, discussed below.

UI

The UI is preferably Microsoft Windows95™ Logo compliant although other operating systems also could be used, e.g., OS/2, WindowsNT, Macintosh, etc. To achieve this compliance, the UI may be built using Microsoft Visual C++ and MFC in accordance with Microsoft's published standards. Both screens and pop-up windows as defined by the Microsoft standard may be used.

Security

The system's security features will use standard, publicly available NIST-approved algorithms. These are discussed below under security, authentication and authorization.

Printing

Any industry standard for the creation of a two-dimensional barcode or matrix code may be used for printing data as part of the indicium 74. The preferred standard is the Data Matrix Symbolizing available from CiMatrix, Shawmut, Mass. (formerly known as International Data Matrix, Inc.). The rest of the printing functions are conventional, and do not have applicable industry standards.

Financial Transactions

All purchase and refund requests will be digitally signed and encrypted for transmission from the host IOn to the transaction server 180. RC2 symmetric encryption standard key pairs (public key/private key) may be used to support such encryption and decryption. RC2 will be used to protect the nature of the purchase/refund request, which may include credit card information. RC2 is a well-known industry standard. RC2 is a product of RSA. RSA is an accepted vendor for these products according to the IBIP Indicium specification dated Jun. 13, 1996.

For credit card purchases/refunds the transaction from the transaction server 180 to the credit bureau 9 preferably will employ SSL3.0 (Secure Socket Layer) standard encryption for secure packaging of the transaction. SSL3.0 is an accepted industry standard for financial transactions across a TCP/IP network. Other suitable encryption standards could be used.

For check payments, a standard lock-box company will be used. Communication with the lockbox company will utilize industry standards. It should be understood that other encryption and decryption algorithms and techniques now or hereinafter in existence also could be used.

Communications

The system requires an active connection to the Internet 30. The method for obtaining that connection is at the sole discretion of the customer. The term Internet also should be understood to include the world wide web, public and private networks and extranets supporting TCP/IP.

Database

The PSP 4 server 180 will store all transaction, customer, and PSD information in one or more industry standard databases, each preferably being an SQL database, using an SQL Server. This product has been adopted as an industry leader in relational database technology, although other relational database technologies could be used, as well as non-relational database technologies.

Miscellaneous

The software design preferably employs industry standards for both the object and database modeling. The Booch methodology may be employed to produce an industry standard object model. The James Martin methodology may be used to generate the data model. Rational Rose v4.0 can be used to capture the data for this methodology and for its output. ERWIN Data Modeler can be used to capture the data and generate the data model used by this product.

Host System & Postal Security Device Features and Functions a. Registration As already described, the customer 2n may initiate a registration process by entering the web site server 150 (FIG. 3), and selecting the "Registration" option. The customer is then presented with a screen that resembles the Postal Service 3601-A license request form. This screen has entry fields for all pertinent address information (required and optional information) and graphical user interface "radio buttons" that allow the user to supply different addresses for shipping, billing, and the physical location of the PC of Host 10n within which the downloaded client software will be resident. When the initial address is entered, all four addresses are stored. For example, the fields to be filled in on the initial address screen typically include: (1) Name, (2) Company, (3) Address (2 lines), (4) City, state, zip (allows for zip+4), (5) E-mail address, (6) Post office where large mailings would typically be deposited, and (7) State and zip for that post office. Items 6 and 7 permit the Postal Service to monitor anticipated mail flow and schedule staff and resources (trucks and planes) to accommodate efficiently the anticipated flow based on the amounts of postage electronically purchased and locally printed, with knowledge of the local postal offices, pick-up and drop-off locations.

The screen also may contain an area to enter an existing "meter number" if the customer has had a registered postage meter in the past. The address fields are then checked for the existence of a PO Box address based upon finding one of the following references: PO Box, PO, P.O., P.O. Box, Box, or Post Office Box and may be cleansed in a conventional manner. See, e.g., the discussion of hygiene (cleansing) in Cordery U.S. Pat. No. 5,454,038 assigned to Pitney Bowes Co.

The request is then submitted to TPS (CMLS) 6. When an approved license is returned from CMLS, a letter is sent to the customer by regular mail informing it of the license number, a customer number, and a customer password.

b. Software Acquisition

The client software is downloaded to the customer's Host system 10n from web server 150. The download is facilitated by state-of-the-art Web technology and data compression. The download operation is secured using SSL v3.0 technology.

The customer 2n enters the download area of the web site 100 and is prompted to enter the assigned customer number and customer password. These entries are checked against the customer record in the Master Database 305. If the customer number and password are valid, the download will proceed. In addition to the client software, the customer 2n will receive a public key and a private key pair file in encrypted form from the web server 150. The keys will be stored on the Host 10 in an encrypted form. The private key is decrypted by the customer password. This private key is then used by the customer 2n and the client software for creating a customer digital signature and for decryption. Since the web server 150 has the corresponding public key, (the server 150 generates the key pair provided to the registered user 2n) the server 150 can use the customer's public key to verify the user's digital signature and to encrypt the indicia 74 (or other data) for downloading to the customer 2n.

c. Software Installation

Using a standard Windows location selection dialog, a user can select the drive and directory location for the software, enter a new directory, or use a default location supplied by the downloaded software. After a successful installation, the customer is prompted to enter a new password to protect the Host system 10.

d. Postage Value Download

A function allows the user 2n to purchase postage from the PSP 4 transaction server 180. It is initiated by selecting a "Purchase Postage" screen in the client software. The screen displays the maximum postage that can be purchased, any fees associated with this purchase, which are charged by PSP 4 or TPS 6 as the case may be, and the total cost for the purchase. The customer 2n must enter an amount of postage to purchase and select a method of payment. The methods of payment are preferably shown with "radio" buttons and include credit card, ACH debit, and check. The default payment is preferably by credit card and the credit card input area is activated.

The customer then initiates transmission of all of the purchase information (e.g., addresses, purchase amount, and credit/check information) via the Internet 30 to the web server 150, which passes on the transaction request to the transaction server 180. When the Submit radio button is pressed, all customer information is digitally signed and encrypted and packaged with the purchase amount. A connection over Internet 30 is established with the web server 150 and the transaction related information is then transmitted. Because the transmission has the appropriate IP address for the transaction server 180 it will be directed by web server 150 through the firewall 160 to transaction server 180, where the transaction will be executed. If a connection cannot be made with the web server 150, then control is passed to an Unable To Connect Error. When the web server 150 responds, the text message received from the server 180 is displayed in the main message area at the top of the screen of the user's Host 10n. Possible responses include Purchase Complete, Incorrect Credit Card Information, Purchase Pending, or Credit Denied. If a Purchase Complete or Pending message is received, the descending register 21 (Postage Remaining field) specifically associated with the customer 2n in the PSD 20n is updated with the new value from the transaction server 180. The actual PSD registers 20n remain on the master server 300; the Host 10 merely displays a copy of the PSD 20n register 21 values.

If the connection with the web server 150 is dropped and cannot be reconnected, then control is passed to the Connection Lost Error. Typically, three (3) communication attempts will be initiated by Host 10n to reconnect with the web server 150. If the connection fails then the process is aborted.

e. Credit Card Payments

If payment is by credit card, the card expiration date is checked. If the customer provided credit card expiration date is earlier than the current date, control is passed to the Expiration Date Error. If credit is denied, an error message is displayed on Host 10n and the credit card information is cleared. If credit is approved, control is passed to the main screen and an appropriate message is displayed in the standard message box of Host 10.

After the user fills out the entire field on the purchase screen and selects a submit radio button, the transaction server 180 immediately constructs a new purchase request object base from these field values.

After the transaction server 180 receives the purchase request, it interacts with the following servers to execute the transaction:

1. Security server 315 (to verify the user's digital signature and to decrypt the transmitted file)

2. Purchase server 190 (after the purchase request object is deciphered by the transaction server 180, it passes to the purchase server)

Credit card requests are transmitted to the web server 150 by the client, forwarded to the transaction server 180, and then to a payment server 190, a credit authorization server 400, and to a remote credit bureau 9 such as to First Data Merchant Services ("FDMS"). The credit authorization server 400 is responsible for connecting to the credit card bureau 9 and getting approval: A "result" code is passed back to the purchase server 190 to indicate whether the credit card has been approved or not. For example, 0 means on the credit link is down (after 3 attempts), 1 means the credit card was rejected, and 2 means the purchase is approved.

f. Check Payments

If payment is by check, the check number is sent to the web server 150 and purchase server 190 along with the information listed above. The response from the purchase server 190 will include a customer number. When the response is received at the Host 10n from the transaction server 180 then control is passed to the Remittance Pop-Up Window.

Check purchasing is very similar to credit card purchasing. The difference is that the purchase server 190 does not need to go through the credit authorization server 400 to obtain any credit approval and typically has a suspense server 310 to enable check processing prior to issuance of postage. Because the check purchasing cannot be validated right away, the purchasing server 190 invokes the Persistence Service and Database Service to update the database record, logging the transaction and updating the descending register in the PSD object. See Logging 196; Customer PSD 200 (increment); Master PSD 40 (decrement) in FIG. 3.

g. ACH Debit Card Payments

ACH debit card can be provided primarily for customers that would prefer this payment modality. Prescheduled payments (or wire transfer) that would trigger purchase could be based on known volumes or peak and valley demand requirements and easily implemented.

h. Refunds

Customer requests for refunds can be initiated by selecting an appropriate Refund radio button. The user must select the type of refund requested: full or partial. If the user selects a partial refund, the amount of refund requested also must be entered. The amount the user enters, when added to the existing refund register, typically cannot exceed some percentage, e.g., 1%, of the current ascending register 22 for that customer. If the amount entered does exceed this amount then control is passed to the Spoilage Limit Error and the refund amount requested can then be changed.

The customer then must enter in credit card, debit card, or check information so that the appropriate account can be credited or a check can be issued. The user presses the Submit button to submit the request to the web server 150 and then to the transaction server 180. For a spoilage refund, a copy of the updated descending register 22 is received from the server 180. The actual descending register 22 is updated on the server 20n.

The customer user presses the Cancel button to cancel the request and return to the Help screen. A request for a full refund will result in the termination of the customer account with the third party service provider 4 and the deactivation of downloaded client software from the Host 10n. If the credit card entered does not match a credit card used for a prior postage purchase then an error message is displayed and the user must enter data for the appropriate credit card.

i. Transaction Complete

In each of the foregoing transactions, once a transaction is completed, transaction server 180 creates a response transaction which is digitally signed with the digital signature of the customer 2n requesting the transaction, encrypted, and sent to the Host 10n confirming the success or failure of the transaction. The host then updates its local information to reflect changes in postage available.

j. Configuration

A configuration feature is desired to allow the user to change the configurable settings for the Host 10n system. It is initiated by selecting a Configure screen including radio buttons for selecting the method of logging postage usage and the address cleansing method. The screen also may contain two postage threshold entry fields and a drop-down list box for selecting a printer 70n. The user 2n is required to make selections for certain settings in a conventional manner. Optionally, log postage can be selected, which the user can use for accounting purposes. Postage usage will differ from the indicium, which is always logged on the Log Server 195. The Log database 196 DB is used to track all transactions between customers and RSP 4. The central database 197 is a staging server used to create data files for transmission to TPS 6, e.g., USPS. The indicium 74 represents a unique identifier that is digitally signed for each mail piece. Logging postage usage would store a log of the address of each letter or label, the date printed, and the amount of postage for that mail piece in a log database 196. This information may or may not be unique because multiple letters could be sent to the same address on the same day. The indicium 74, however, will always be unique and digitally signed. Logging postage usage is the default.

The user also will typically choose a method by which addresses will be cleansed (also referred to as hygiened) as well as the printer 70n to be used by the system. Cleansing addresses refers to the conversion of all entered addresses to a United States Postal Service standard format, including ZIP+4 prior to printing the mailing envelope or label. CD-ROM cleansing is the default, where it is done at the Host 10n. An alternative choice is to perform cleansing via the web server 150. The user can change this selection via a standard drive selection list-box.

Any suitable printer 70n may be used, for example a Postscript printer or Windows-compatible printer.

The Password button can be used to change the password entered during registration. There are also a number of addresses that are required by the system. These addresses are maintained by pressing the <u>A</u>ddresses button. Other optional settings are the default amount for purchases, as well as the amount at which a low postage warning is triggered. An error is raised if either amount is greater than the maximum amount of postage allowed.

k. Print Postage

The print postage feature allows the user 2n to print postage onto a selected envelope or label or a series of envelopes or labels (e.g., an array of labels as exist on a preprinted label form). It is initiated by selecting the Print Postage Screen on the main screen. The screen contains a button for entering a single address and a standard file selection area for selecting a mailing list. The screen also displays radio buttons for class of mail service and the method for calculating postage. The defaults for these are first class, and fixed price (set at $.32).

The user 2n must indicate whether a Single address or Multiple addresses will be printed. This is accomplished by pressing a button for a single address or by selecting a Mailing List file. A Mailing List is selected by selecting the name of the appropriate mailing list. Once a single address has been entered or a mailing list has been selected, a drop-down list box is activated and populated with the appropriate address(es).

Additional information may be required such as the Class of postage by which the mail piece(s) will be shipped and the method of calculating the postage. The system may be established so that the user selects Calculate Weight, whereupon the number of sheets of paper being mailed and a paper weight (as indicated on the paper packaging (e.g., envelope, box, etc.)) are entered. A suitable application will then calculate the total weight by referring to an algorithm resident in the downloaded client software, for example, multiplying the single sheet paper weight by the number of sheets indicated. The result is then added to the weight of the packaging (e.g., an envelope) via a table look-up. The postage for that weight and class is then determined and the list of addresses is updated.

All downloaded client software and tables, including postage rate tables, may be updated each time the user Host 10 connects to the web server 150. The PSP 4 also may have the current rate table available on-line to registered users 2n for a reference. In addition, all indicia 74 (i.e., for each piece of mail) shall be logged on the server 195 whenever a print request is made by a user 2n, whether the print request is for a single piece or multiple pieces for a mailing list.

Figure 1A:
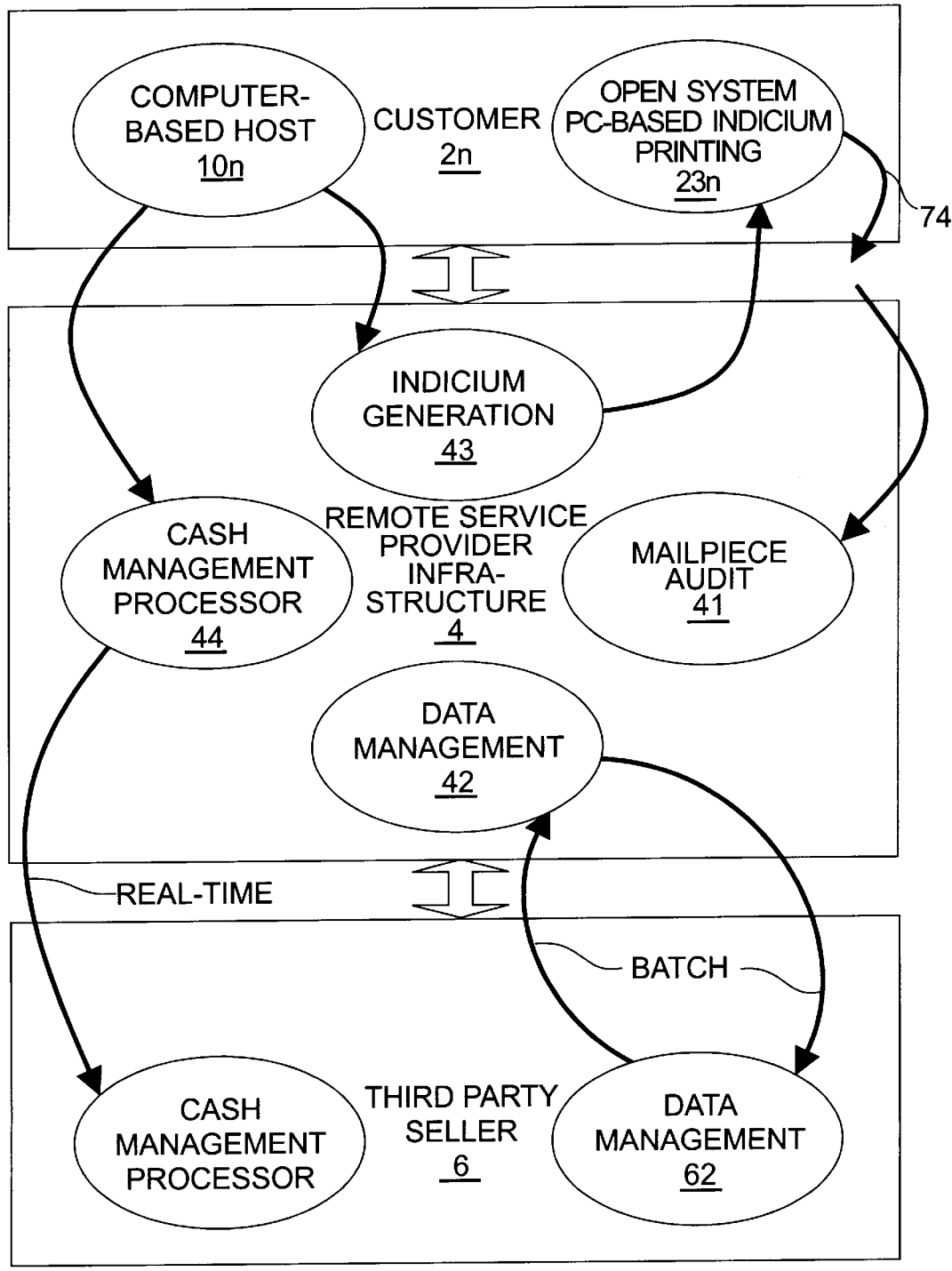
FIG. 1A is a diagram of the transaction and maintenance functions of the system of FIG. 1.

With respect to maintaining logs databases 196, 197 of indicia files on the transaction server 180, it is expected that the United States Postal Service will permit these files to periodically be off loaded onto tape, or otherwise transmitted periodically. See, e.g., FIG. 1A, the reference to "batch" connecting data management functions 42 and 62.

If the total postage for the job exceeds the postage available then system control may be automatically passed to the Insufficient Postage Error and then to the Purchase Postage screen.

Once all information is entered, the complete list of addresses and their corresponding postage will be available for review in a drop down listbox. Pressing the Change Postage button can change postage for individual entries when that entry is highlighted. Conventionally only one entry at a time can be changed. Control is passed to the Single Address Entry Pop-Up. If the postage entered for a fixed amount is less than $0.16 then control is passed to the Invalid Amount Error. Postage can be applied in fractional amounts down to three (3) decimal points. Of course, the postage amount can be adjusted as permitted by the USPS. It should be understood that the present invention may be adapted for use with any carrier service other than, or in addition to, the US Postal Service by modifications that can be made by persons of ordinary skill in the art.

Preferably, the system permits the user to preview a single envelope or label by pressing a Print Preview button. This will cause the return address, the mailing address, and a bitmap of a sample indicium 74 to be displayed as it would appear printed. Pressing this button will pass control to a standard Print Preview screen. If the user wishes to print the entire list, the Print All button is selected. Pressing Print All causes a connection to be made to the web server 150 and a file of addresses sent. This file is digitally signed by the client Host 10n for the transaction server 180 to verify. On the transaction server 180, the digital signature on the file will be verified by validation (also called the security) server 315, each address will be extracted individually and the contents of that address, along with additional information, will be used to create both the human- and computer-readable parts of the indicium 74. See indicium generation 43, FIG. 1A. The postage rate table used is checked to see if it is current, and the postage amounts are recalculated if needed. The contents of the indicium are then hashed (MD5) into a message format and the resulting message is digitally signed by transaction server 180 using the well-known DSA. The indicium is then encrypted for the client to decrypt. The indicium is encrypted to prevent unauthorized capture of the indicium. An unencrypted indicium could be captured, printed, and entered into the mail stream prior to it being obtained by the authorized customer.

The results of this process are sent back to the Host 10n for formatting and printing. As each indicium 74 is hashed, the appropriate postage amount is deducted from the customer's descending register 21n on PSD 20n located on the master server 300. A copy of the updated PSD register 21n is then downloaded to the Host 10n for display to the customer 2n. Once the Host 10n has successfully received the indicia, the connection to the web server 150 can be terminated. A server connection is not required during the physical printing process. The number of indicia that can be downloaded and printed at one time is limited only by the amount of disk space available on Host 10n. Each indicium will typically consume 2K of disk space for the aforementioned two dimensional matrix codes and data.

Figure 4A:
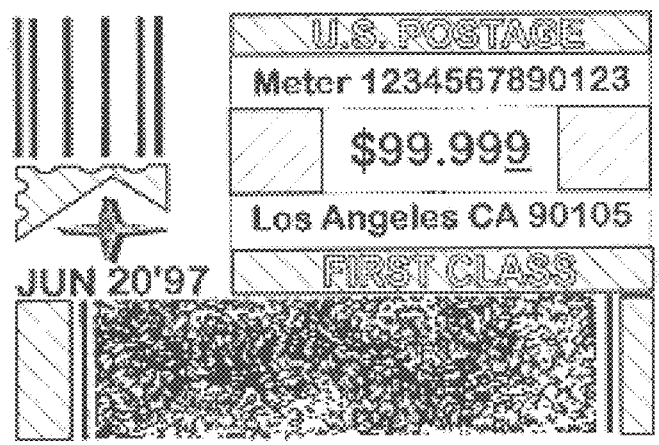
FIGS. 4A and 4B are representative digitally signed indicia for printing on mail pieces in accordance with the present invention.

The following information is then printed on the envelope or labels: Return Address (optional) 71 (previously entered during registration or changed via Configure), mailing address 72 (obtained from list), graphic image 73 (if selected via page setup screen), and indicium 74 (constructed when "print all" is pressed). See open system pc-based indicium printing 23 on FIG. 1A and FIGS. 4A and B. For example, one proposed indicium 74 is illustrated in FIG. 4A, which, among other things, conforms to the specifications in the Domestic Mail Manual—P050, dated Sep. 19, 1996.

A Test Print Quality button also may be provided. Pressing this button causes a sample envelope to be printed. This envelope can then be mailed to the PSP 4 as a quality assurance test of the user's Host 10n system and printer 70n. See FIG. 1A mail plan audit 41 This button is preferably rendered inactive, except when the Quality Assurance (QA) Date stored is more than three (3) months prior to the current date. In that case when the Test Print Quality button is pressed an envelope is produced and the QA Date is set to the current date.

l. List Management

A List Management feature is preferably provided which allows users 2n to create and manage mailing lists within the Host 10n and is initiated by selecting a Manage Mailing Lists screen. Optionally, the user 2n can choose to import a mailing list from a non-Host system file, and the system will preferably will support a number of mailing list formats. Once the file is created via an import it can be automatically sent to the cleansing function, either CD-Rom or on-line, edited, cleansed again if appropriate, saved if desired, and set up for postage purchase.

m. Postage Correction

A postage correction feature allows the user to print a correction indicium in the event that the postage amount or the postage date is incorrect. It is initiated by selecting a Correct Postage screen and choosing the appropriate correction for a postage amount or a postage date. Invalid information will be identified once valid information is provided. A connection is made to the PSP 4 server 150 and the correction transaction is validated. Notification is sent to the Host system 10n and the user is informed whether to place the envelope back in the printer 70 in the same direction as the first printing or to reverse it before printing.

Security

The present invention advantageously uses the internet 30 connection for registration, client/server authentication, transmission of credit card information, transport of indicia, requests for refunds, change of personal/address information, and the exchange of addresses for cleansing. Each of these transactions will require different types of security to ensure the safe exchange of information between the Host 10n, PSD 20n, and printer 70n. Conducting financial transactions over an unsecured channel such as the internet 30 requires the use of cryptographic modules. In the present invention, each client 2n has a cryptographic module 12n and the RSP server 4 has a cryptographic module 14. The server cryptographic module 14 serves three functions: (1) authentication, (2) encryption, and (3) authorization. Authentication is the only function that requires interaction with a client cryptographic module 12. This is discussed below.

The physical architecture of the system of the present invention was designed to ensure that all access to the system is through secured and monitored points. The entire system that is at PSP 4 will reside on a private network and the transactional portions will be connected through a firewall 160 to the internet 30. Firewall 160 will be configured to restrict all network traffic to a single TCP/IP port 140. All packets received by the firewall 160 on the specified port will be routed to a Transaction Manager (i.e., transaction server 180. It is noted that the actual implementation may have a plurality of transaction servers 180n, and routing a given packet to a transaction server 180 may be based on an address field in the packet or on a first available server, as the case may be. Once a transaction server 180n receives the packets that request a socket connection, a socket connection will be established. The transaction server 180 will immediately require that each particular connection authenticates a client 2n, or the connection will be dropped. To ensure this safe exchange, the implementation of security uses the following assumptions:

The host 10n and PSD 20n functions will not reside on the same machine. The PSD 20n functions will not be stored in a separate hardware device connected to the customer's PC. The Host 10n will exist on the customer's PC and the PSD 20n will exist on the PSP 4 network infrastructure. The Internet 30 will be used to interconnect a customer's host 10n and printer 70n with the PSD 20n. All transactions between the Host 10n and the PSD 20n will be encrypted. All transactions between the host 10n and the PSD 20n will be digitally signed. All indicia 74 will be digitally signed. All indicia 74 will be encrypted for client 10n to decrypt prior to printing. Prior to initiating a transaction, both the client 10n and the provider transaction server 180 will authenticate each other. A customer's actual existence and proof of valid physical address will be initially established by sending the system license and registration information to the customer by mail. All cash management functions will be performed within the treasury component of the RSP 4, namely, payment server 190, separate from the PSD 20n functionality.

The following discussion describes a preferred security model to be implemented. The downloaded client software performs all Host 10n and printer 70n functions, as defined by the appropriate IBIP specifications. The transaction server 180 performs all of the PSD 20n and TPS 6 infrastructure and support functions, as outlined by the IBIP specifications. Each client 2 and server 4 is comprised of its own cryptographic module 12 and 14, respectively. For authentication and key expiration/regeneration the two modules 12 and 14 interact.

a. Client Cryptographic Module Security

The cryptographic module 12 is used to authenticate the customer 2n to the TPS 4 (hereinafter also referred to as "server 4"), the server 4 to the client 2n, and to manage the authentication key pair (public key/private key) that exists on the client 2. The main function of the client cryptographic module 12 is to protect the customer's private key from both intrusion and corruption. The customer's private key is used to authenticate the client 2 to the server 4.

To protect from intrusion, the private key is preferably stored on a diskette (designated A: or B:) in a ciphertext key form. The ciphertext key is decoded when the customer enters their password. Thus, the plaintext form of the private key exists only in RAM. When cryptographic operation is completed, the plaintext key is zeroized.

To ensure the integrity of the private key, a hash of the key is concatenated to the key prior to creation of the ciphertext key. When the ciphertext key is decoded, the key is hashed and compared to the stored hash to determine the key's integrity.

The components of the client cryptographic module 12 are: Client Private Key, Client Public Key, Server Public Key and Customer Identification Number.

The algorithms used by the cryptographic module, each themselves well known, are: (1) RSA, (2) MD5 and (3) RC2.

The system is designed so that client 2 needs to provide no physical security to protect the cryptographic module 12. This is because no key is stored in plaintext form and the decryption process is performed only when needed. After a key has been used it is zeroized in memory. At no point are the keys and/or password accessible on the hard disk in a plaintext form.

i. Description of the Client Cryptographic Module

The cryptographic module 12 preferably exists within the context of what is called a CryptoManager. The CryptoManager is preferably a C++ object stored as a statically linked DLL. When the client software is loaded into memory, it will create an instance of the CryptoManager object. By statically linking the CryptoManager Object to the Client, it can be assured that no other program has access to the DLL, hence protecting the CryptoManager's services.

The most important responsibility that the CryptoManager assumes revolves around protecting a file known as the Key File. The Key File will contain the necessary information to uniquely identify and authenticate a client 2n to the server 4. It is composed of four items. 1) The Client's Public RSA Key; 2) the Client's Private RSA Key; 3).the Customer Identification Number; and 4) A Digital Hash of 1, 2, and 3.

ii. Key File Download

Figure 5A:
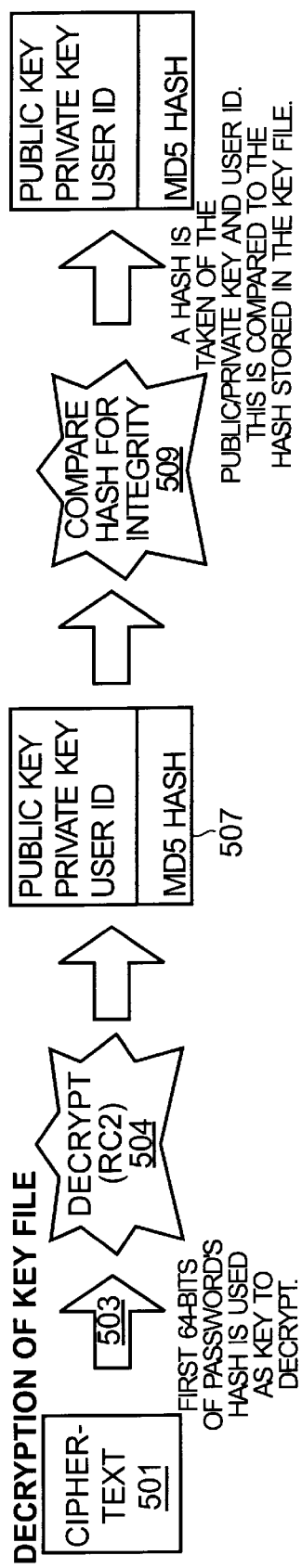
FIGS. 5A, 5B and 5C are respectively diagrams of cryptographic module functions for description f a key file, changing a password and key expiration of the system of FIG. 1A.
Figure 5B:
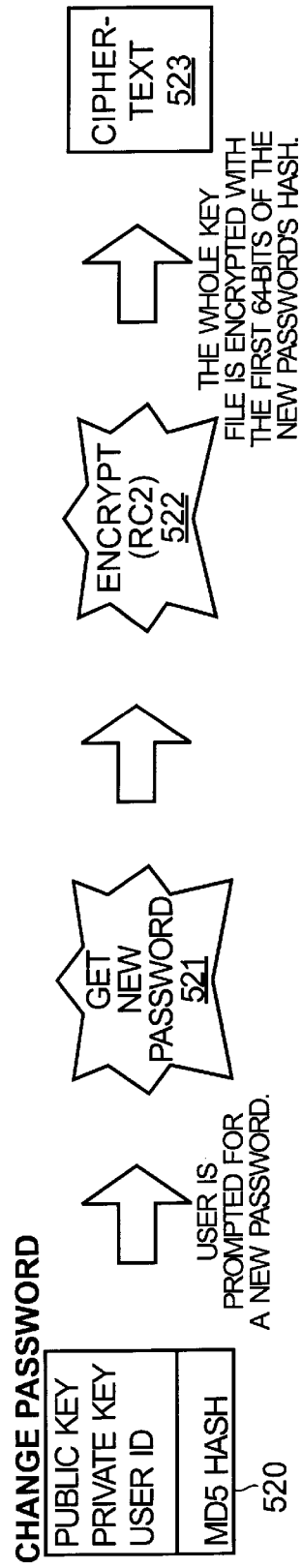
Figure 5C:
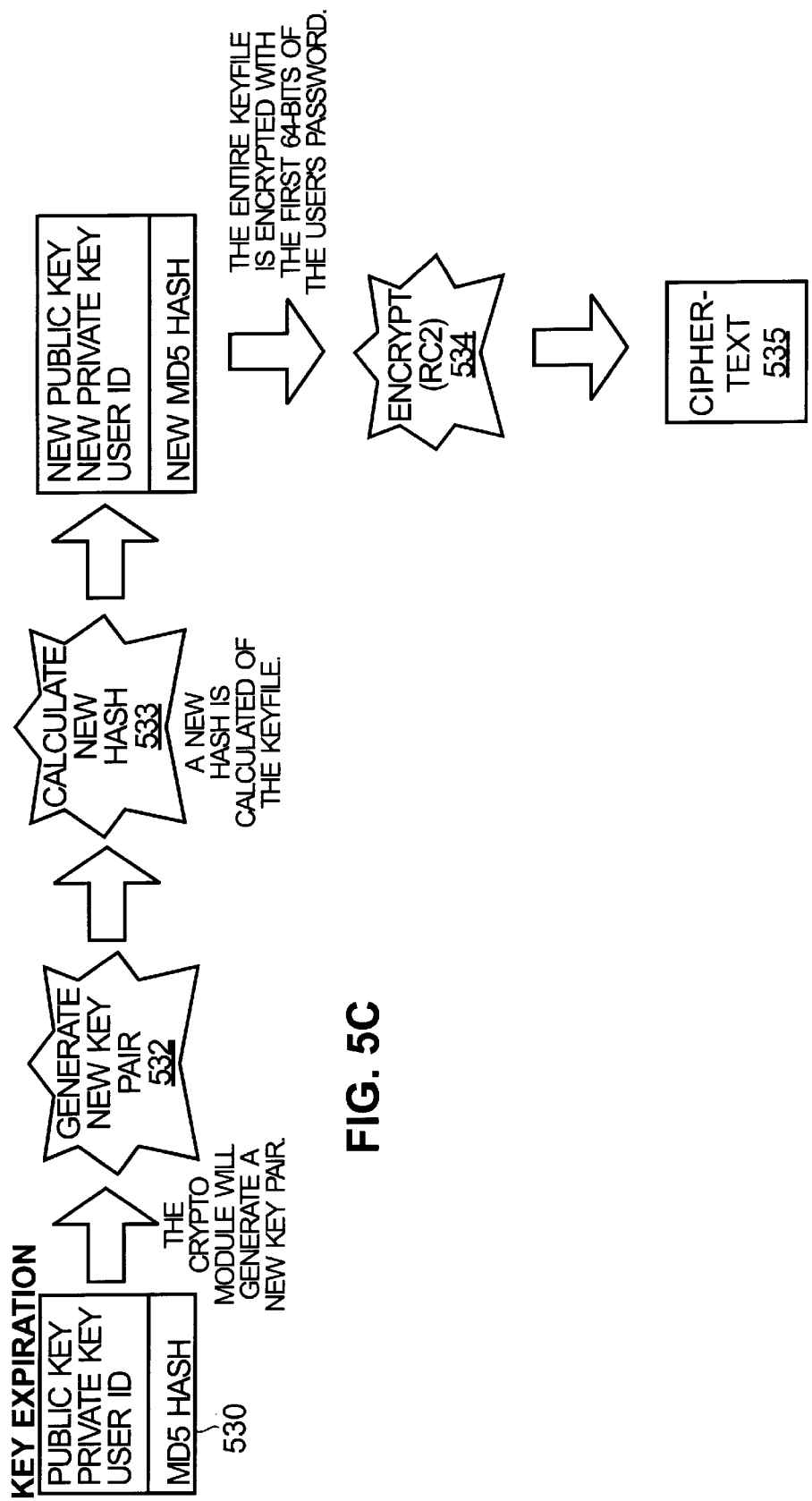

Referring to FIGS. 5 A–C and 6A & B, the server 4 generated key file is made available to the customer after a successful registration. The customer 2n is mailed a letter containing instructions on how to download the key file, a user name, and two passwords. One password is used to logon to the web server 150, establish an SSL 3.0 session, and acquire the user's unique key file. The second password will be used to decrypt the contents of the key file.

iii. Key Integrity/Protection

In order to ensure integrity of the plaintext key, a hash is embedded inside the key file. The whole file is then encrypted with RC2 using a key derived from an MD5 hash of the user's password.

Referring to FIGS. 5 A–C, when attempting to open the key file, the user's password 501 in ciphertext is converted into a 160-bit MD5 hash 503. The first 64-bits of the hash is used to both encrypt and decrypt 504 the key file. After the key file has been successfully decrypted, the integrity of the contents must be ensured and another hash of the key file is calculated 507. This hash 507 of everything contained in the key file (public key, private key and user identification number) with the exception of the hash value stored at the end of the file. The resulting hash is then compared at 509 with the hash at the end of the file 501. If the values match, the plaintext key from decrypted 504 is loaded into RAM memory. The user's password (503) is not stored.

iv. Key Renewal

The key file is preferably provided a mandatory life span that will be enforced by the Host 10*n*'s cryptographic module 12. After a designated period of time, the Host 10*n* will open an interface 530 that will require the client to re-generate a new pair of public and private keys 532. The client will generate a new key, using a standard Microsoft CryptoAPI™ function, calculate a hash of the key file, encrypt the key file using the first 64 bits and store the generated key pair as ciphertext keys 535. The client 2 will then send the new public key to the web server 150. The client cryptographic module 2 will authenticate with the cryptographic module 14 of server 4 to verify that the key-renewal process was successful.

v. Password Change

Typically, the user will be required to change the password the first time it runs the downloaded client software. The user can also change the password at any time after the initial requirement. The crypto-manager will expose an interface 520 that allows the client to perform this task. The interface will require that the user provide both the old and the new password 521. Once the password has changed, the key file will be decrypted using the old password and then encrypted with the new password 522. The key is stored as ciphertext 523 and will not be in plaintext form.

vi. Authentication

Figure 7:
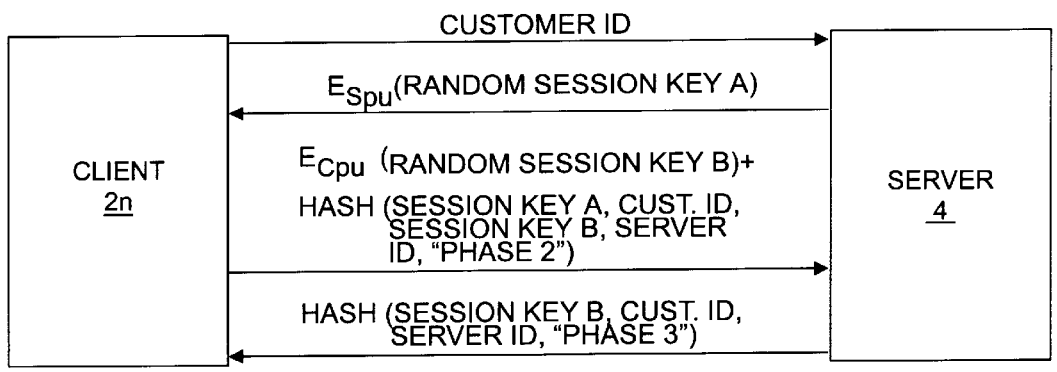
FIG. 7 is a block diagram of the architecture an authentication process of the system of FIG. 1.

The authentication service is responsible for authenticating each client 2*n* with the server 4. As illustrated in FIG. 7, a sequence of three messages is transmitted between the client 2*n* and the server 4. $E_{spu}$ refers to RSA encryption using the server's public key. $E_{cpu}$ refers to RSA encryption using the client's public key. In the case where the client 2*n* fails to authenticate with the server 4, the authentication protocol is terminated and the communication link between the client 2*n* and server 4 is severed. If the client 2*n* is able to successfully authenticate with the server 4, then the session keys exchanged and established during authentication can then be used to encrypt communications between the client 2*n* and server 4. Authentication is discussed more fully below in connection with server 4.

vii. House Keeping

After authentication, the client 2*n* executes a HouseKeeping Service. This Housekeeping service is responsible for notifying the client software of any new postal table information or changes and of key expiration events. The HouseKeeping Service queries the server 4 to ensure that current keys have not expired. If the keys are about to expire the client 2*n* will issue a command to renew the keys and a new public key will be sent back to the server 4. The client 2 must then re-authenticate with server using the new keys. If the keys have not expired, then the HouseKeeping Service will check the postage rate tables. If the postage tables need to be updated, the client 2 will submit a request to server 4 for new postage tables. If the keys have not expired and postage tables do not need to be updated the HouseKeeping service exits.

viii. Finite State Machine

Figure 8:
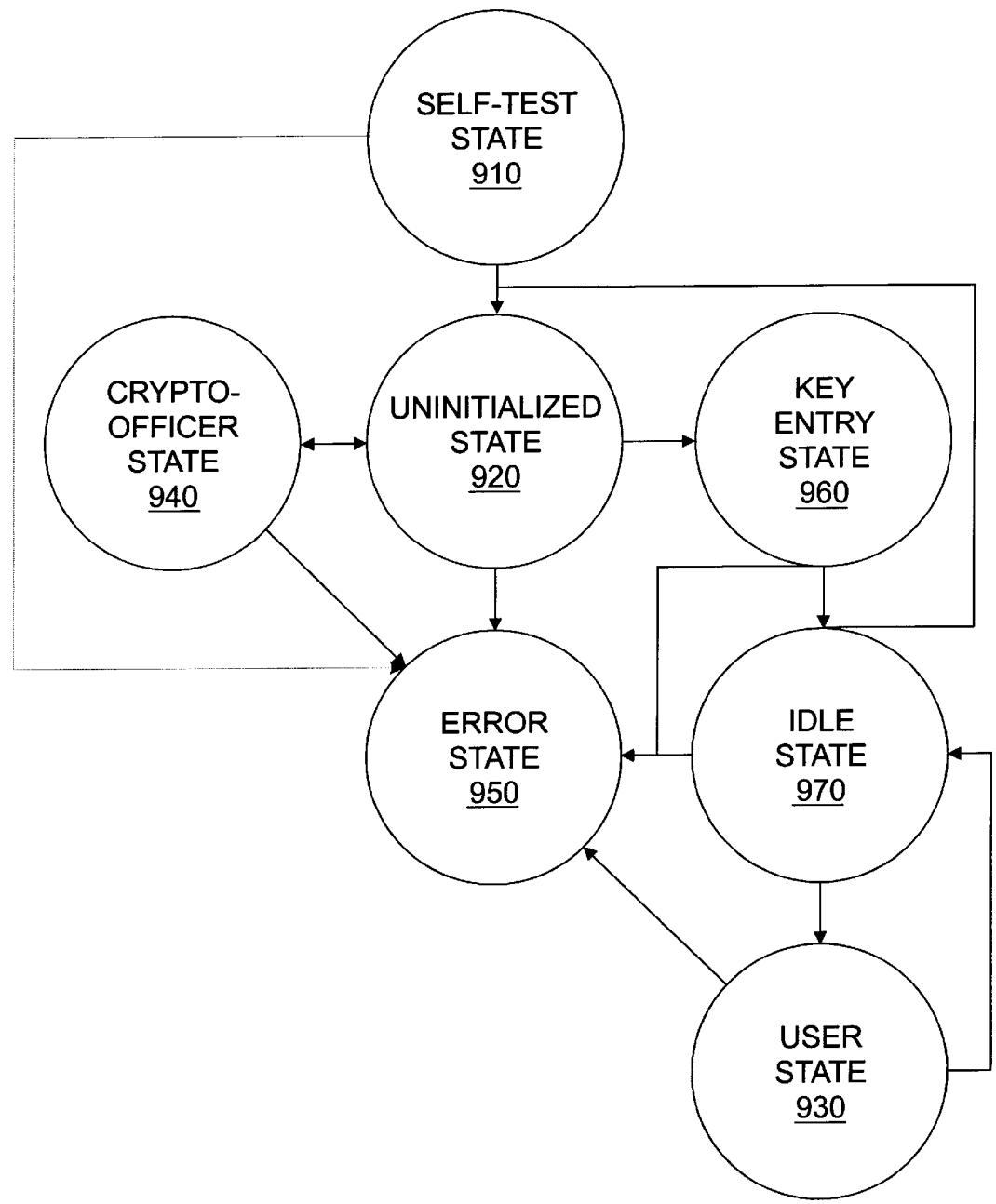
FIG. 8 is a finite state diagram of the server cryptographic module of the embodiment of FIG. 1.

With reference to FIG. 8, the finite state model defines a preferred set of system access rules. The model defines secured and unsecured states and all state transitions. When the client software is executed, the client cryptographic module 12 initially enters a Self-Test State 910. The Self-Test State 910 is when all self-tests are performed. If all self-tests pass successfully the module proceeds to enter the Un-Initialized State 920, otherwise the module will enter into the Error State 950. When a client 2 to server 4 transaction is initiated, the cryptographic module 12 enters the User State 930 and/or the Crypto-Officer State 940 as described below.

The Error State 950 indicates that an unrecoverable error has occurred. If the module 12 enters the Error State, the module will no longer perform cryptographic functions. If keys are loaded into the module 12 when the cryptographic module enters the Error State, all keys will be cleared from the module.

The Cryptographic module 12 enters the Un-Initialized State 920 after the Self-Test State 910 has completed and no errors have been reported. No keys are loaded into the module during the Un-Initialized State and therefore no cryptographic functions can be performed. If the cryptographic module attempts to perform cryptographic functions while the module is in the Un-Initialized State 920, the client software will first check to make sure that a key file is present. If no key file is found, the module will prompt the user to register the software and download a key file. If a valid key file exists, the user is challenged with a password. The password is used to attempt to open the file. If the password successfully decrypts the key file, the cryptographic module enters into the Key Entry State 960. If the password is not able to successfully decrypt the key file then the module remains in the Un-Initialized State 920. If the key file has been corrupted or compromised then the module enters the Error State 950.

In the Key Entry State 960 the cryptographic module 12 loads the keys obtained from key file. The Initialize function of the Crypto-API library is used by the cryptographic module as a means of initializing the crypto-context with the keys.

The User Services State 930 is used to perform all cryptographic functions, not related to key management, which are performed by the cryptographic module 12. As soon as a key-related function is complete, the plaintext keys in memory are zeroized and the module enters the Un-Initialized State 920.

The Crypto Officer State 940 is entered only when the key file needs to be updated. This will happen either when the user changes the password or when the current RSA keys expire and need to be changed. The server 4 during authentication will trigger replacement of expired keys.

The Idle State 970 illustrated in FIG. 8 is used in the server cryptographic module 14discussed below, but not in the client cryptographic module 12, which either works or does not work, but does not remain idle.

b. Server Cryptographic Module Security

The server cryptographic module 14 of server 4 is responsible for protecting two categories of data. These two categories are Cryptographic Keys, and the transactional PSD 20*n* Registers 21*n* and 22*n*. In addition, the server cryptographic module 14 will be responsible for managing all "certificates" that exist on the server 4. All of these data items have been placed within the server cryptographic module 14 and are protected by its security policies.

In addition to protecting sensitive data, the server cryptographic module 14 runs many security services. These services include client authentication, key management and PSD management. The security services are governed by policies that dictate who can access them and what data they can control.

The client 2 has no direct control over the services performed by the server cryptographic module 14. All services performed by the server cryptographic module 14 are under the direct control of a Transaction "Manager" server 180. Once the client 2 has been authenticated, it submits a transaction request to the transaction server 180 and waits for a response. It now becomes the job of the Transaction Manager to process the transaction and return a "receipt" to the client 2. All transaction "receipts" will contain a date/time stamp, and a sequence number and a digital signature to verify the authenticity of a transaction in relation to other similar transactions. For a given customer 2n, the sequence number will increase by one each time until a threshold is met, e.g., 10,000, at which point the counter will reset to 1.

The Transaction Manager embodies the logic required to complete a transaction while enforcing the security and integrity of the server cryptographic module 14. Based on the authenticated user 2n, the transaction requested, the date/time stamp, and the sequence number, the Transaction Manger would determine whether the requested transaction is valid. The Transaction Manager will complete the transaction by sending a receipt, including a digital signature as evidence of payment for the transaction, back to the client 2n. In the case of the postage purchase system, the receipt is the indicium 74, which includes the foregoing and the postage related information (addresse, postage amount, etc.).

The Transaction Manager server 180 also is responsible for performing non-cryptographic functions. For example, address cleansing, credit approval and customer profile changes, which are performed by transaction server 180, do not require the use of cryptographic functions, and are therefor considered outside the realm of the server cryptographic module 14.

The server cryptographic module 14 serves three essential functions authentication, encryption and authorization. Authentication is the only function that requires interaction with the client cryptographic module 12. This interaction is secured in a manner described elsewhere.

i. Physical Security

The physical security of the server cryptographic module 14 will be protected by measures taken to securely house the server 4, and its backup, preferably in a locked and guarded site. All servers will be stored in locked cages that will be accessible only to the system's administrator. Access to the building housing the servers will be limited to authorized personnel only. In addition, a TIS firewall 160 will be used to protect the single port 140 that will be available to the Internet 30, and restrict traffic entering the server segment to TCP/IP packets only.

ii. Cryptographic Module Data

The server cryptographic module 14 manages cryptographic keys, certificates and PSD registers 21, 22. All sensitive data is stored in a Secure SQL Server Database and protected by SQL Integrated NT security. See FIG. 3. The Secure SQL Server database 305 is considered a part of the server cryptographic 14 module and may only be accessed by the cryptographic module.

iii. Cryptographic Keys

The Cryptographic keys are utilized by the cryptographic module 14 to perform two main functions, authentication and indicium generation. The cryptographic module stores the following keys. Client Public Authentication Keys (RSA) A Client Public Authentication Key exists for every registered user. They are used to prove the client's identity when it attempts to establish a connection with the server 4. This will be typically a 1024 bit key. Server Public/Private Authentication Key Pair (RSA) Only one pair of Server Public/Private Authentication Keys exists on the server 4. These are used to prove the server's identity when the client 2n attempts to establish a connection with the server. This will be preferably a 1024-bit key. Client Private Indicium Keys (DSA) A Client Private Indicium Key exists for every registered user 2n. It is used to generate the digital signature required to produce an indicium 74. This will be a 1024-bit key. Server Internal Private Key (DSA) This key is used to sign data that will be used to communicate with the TPS 6, in this embodiment, the USPS. This will be a 1024-bit key.

iv. Certificates

Certificates are data structures that bind public key values to subject identities. The binding is achieved by having a trusted Certification Authority (CA) digitally sign each certificate. By verifying the Certification Authority's signature on the certificate, one can be confident that no substitution of the information within the certificate has taken place. There are two classes of certificates used by the cryptographic module 14. The first class is the ITU-T X.509 standard (formerly CCITT X.509 (referred to as the X.509 certificate)). The second is a USPS IBIP deviation that does not use the ASN. I encoding scheme, and has very few fields in order to minimize the required storage space for the certificate. This second certificate is reserved for the PSD 20n.

The certificates used by the cryptographic module 14 essentially complement the private keys described in the above section with the exception of the Server Authentication Keys. The Client Indicium Certificate is the data used to generate the digital signature of the indicium. The actual signature is signed with the complementary key of the certificate's public key. This way, based on the contents of the certificate, an exterior entity can verify authenticity of the generated indicium 74. The Server Certificate is used by the USPS to confirm the server's identity. The USPS requires that the server 4 periodically communicate with it to transfer information regarding postage sold. This certificate is used to ensure safe delivery of this information. The Certification Authority Certificate issued by the Certificate Authority allows the server 4 to verify messages sent by various other parties that have been certified by the same Certification Authority.

The X.509 Certificate is the current standard for digital certificates, and it defines the following fields:

1. Version: For forward and backward compatibility.
2. Serial Number: An integer that, together with the CA's name uniquely identifies this certificate.
3. Signature: Specifies the algorithm used to compute the signature on the certificate.
4. Issuer: Name of issuer of the digital certificate.
5. Validity: The time duration and period for which the certificate is valid.
6. Subject: Name of entity whose key is being certified.
7. Subject Public Key Information: Entity's public key.
8. Issuer's Unique Identifier: Optional, uniquely identifies the issuer of this certificate.
9. Subject Unique identifier: Optional; uniquely identifies the subject of this certificate.
10. Algorithm Identifier: Same as Signature.
11. Encrypted: The actual digital signature generated by the algorithm specified in field 3.

Field 3 is typically used for encryption algorithms, such as DSA or RSA. They operate on the basis of having two unique keys: a public and a private key. Signing an item with a private key means having the ability to verify it only by using the corresponding public key. The private key is securely kept in a location that is only accessible to its intended users; knowledge of someone's private key means having the ability to impersonate them. The public key is made publicly available to all individuals wanting to verify an item that is digitally signed by the user. The public key is made available in the X.509 certificate (field 7).

For example, if user A wanted to verify the digital signature of an item issued by B, user A would request that B send an X.509 certificate. User A can then verify the authenticity of the X.509 certificate by looking at the digital signature contained as part of the certificate (field 11). If the certificate were issued by a trusted third party (Certificate Authority) such as the USPS then user A would already have the USPS X.509 certificate. User A would first extract the USPS public key from the X.509 and use that to verify the signature in B's X.509 certificate. If the signature verifies then the X.509 certificate is authentic (or at least according to the USPS), user A can then extract B's public key from the X.509 certificate and similarly verify the digital signature of the item issued by B. User A can then optionally store B's digital certificate.

The implementation of the software is in accordance with the IBIP specification document. In the registration process, a new user 2n would contact the server 4 with information that uniquely identifies him/herself The client's host 10 would generate a pair of public/private key pairs and would send securely the public key up to the server 4. The server 4 would then take the public key information and send that along with any other necessary information to the USPS in order for the TPS 6 USPS to generate the user's X.509 certificate. The host 10 would print out a written agreement that will be hand signed by the user 2n of the system and mailed to the TPS 6 USPS . When the USPS receives the signed agreement it will then generate the X.509 and send it to the server 4. The server 4 will in turn forward the certificate to the host machine 10.

An alternate system would provide the server 4 as a trusted third party (Certification Authority). The USPS can then utilize the server 4 public key to verify authenticity of printed indicia. A printed indicium can be associated with the third party provider 4 who issued the certificate by checking the issuer's name field.

v. PSD Registers

The PSDs 20n are the devices used to track how much postage both individual clients 2n and the server 4 own. The PSD 20n contains ascending and descending registers 21n and 22n that keep track of the total amount of postage a user 2n has spent and owns. The server 4 maintains a separate PSD 20n (indicated by a letter subscript "n") for each registered customer. This keeps track of the total amount of postage each customer owns and has spent. The server 4 also maintains a master PSD 40 with ascending and descending registers that keep track of the total postage it owns and has sold.

The following Table III is a summary of the data typically maintained within the cryptographic module 14.

TABLE III

| Cryptographic Keys | Certificates | PSD Registers |
|---|---|---|
| Client Public Authentication Key (RSA) | Client$_n$ Indicium Certificate | Client PSD 20 |

TABLE III-continued

| Cryptographic Keys | Certificates | PSD Registers |
|---|---|---|
| Client Private Indicium Key (DSA) | Server Certificate | Master PSD 40 |
| Server Public/Private Authentication Keys (RSA) | Certification Authority Certificate | |
| Server Internal Private Key (DSA) | TPS 6 Certificates | | vi. Server Cryptographic Module 14 Services

Authentication Service

The authentication service is responsible for ensuring that only authorized users 2n have the ability to submit transaction requests. It will utilize the client's public authentication keys to perform the user validation. Upon successful authentication the transaction manager (server 180) will handle the user's transaction request.

Key Management Services

The Key Management service will be responsible for key generation, expiration, archiving and distribution. These operations are performed on cryptographic keys and certificates. There are three levels of authority involved in key management. They are the server, client and the Certification Authority (CA). The details of how/why these keys are generated can be found under the Key Management section in the description of the cryptographic module 14 .

Indicium Generating Service

This service is used for the generation of indicium 74. It requires access to the PSDs 20n, the client's private indicium key, and the certificate.

Registration Service

The Registration Service is outside of the cryptographic module 14. It is essentially responsible for adding new users to the PSP 4 system. It communicates with the Transaction Manager server 180 to generate a new encrypted user key file, which is later downloaded by the client 2.

Cryptographic Module Roles

The cryptographic module 14 supports the use of two roles to perform different cryptographic functions. The first role is the Crypto-Officer that is responsible for performing all the key management functions. The other role is the Crypto-User, which has access to use cryptographic functions and keys for the purposes of authentication and indicium generation. The roles provide a logical separation between operators and the services they are allowed to perform.

vii. Description of the Cryptographic Module

Authentication and Encryption

When a client 2n establishes a connection with the server 4, the server 4 immediately enters an authentication protocol as illustrated in FIG. 7. The first step of the routine is to authenticate the client 2n. The client 2n sends its customer ID in plaintext form. This information is used to verify that this is a valid customer and retrieve that customer's public key. The client 2n creates a random session key, identified in FIG. 7 as Session Key A. The client 2n then uses the server's authentication RSA public key to encrypt Session Key A, and transmits the encryption to the server 4. The server 4 receives and decrypts the key using its private authentication key.

The server 4 then creates a random session key of its own, identified in FIG. 7 as Session Key B. The server 4 uses the client's public authentication key to encrypt Session Key B, and transmits the encryption to the client 2n. The client 2n receives and decrypts the key using its private authentication key.

The server 4 also builds up a hash value of Session Key A, the client ID, Session Key B, the server ID and the text "phase 2". This hash value is sent to the client 2n concurrently with the encrypted Session Key B. The data is hashed in a standard sequence, so that the client 2n will be able to properly validate it. The client 2n receives the server's hash value and then validates it by creating a hash value of its own containing the same data, and by comparing the two hash values. At this point, if the two hash values do not match, the protocol is terminated and the communication link between the client 2n and server 4 is severed.

If the hash values do match, the client 2n then builds up another hash value, containing Session Key B, the client ID, the server ID and the text "phase 3". This hash value is sent to the server 4, which validates it by creating a hash value of its own containing the same data and comparing the two hash values. If the two hash values do not match, the protocol is terminated and the communication link between the client 2n and server 4 is severed.

Once the client 2n and server 4 have exchanged session keys and hash values and the hash values have been properly validated, the protocol is complete and the client 2n and server 4 have been authenticated to each other. Session Key A and Session Key B can then be used by the client 2n and server 4, respectively, to encrypt and secure communications to each other.

The session keys generated during the authentication process are preferably 64-bit RC2 symmetric keys, which are used to encrypt and decrypt all data sent between the client and the server. A hash of the data value is appended to all transaction request data or a transaction receipt before it is encrypted and sent to the other party. The recipient uses the hash to ensure message integrity. If the message is found to be corrupt or altered in some way, the transaction will be aborted.

At the end of the Authentication protocol, the client cryptographic module 12 will store the Customer ID and the session keys as part of the initialization routine. This information will then be available to all services running under Crypto-User role for a particular user.

Key Management

The transaction server 180 is concerned with two types of public/private key pairs, authentication and indicium generation. Authentication keys are 512-bit RSA keys and the indium generating keys will 1024-bit DSA keys. Both the client 2 and the server 4 each have a pair of authentication and indicium generating keys.

Client Authentication Keys

The server 4 initially produces the client authentication keys. The server first generates the client's public/private RSA 1024-bit keys. It then bundles the client keys, the server's public key and the client's identification number into a single file. A MD5 hash of the file is produced and appended to the end of the file. Finally, the server 4 takes the content of this file and encrypts it with a random number that it generates. The produced ciphertext is referred to as the key file. The server generated password initially used to encrypt the key file is mailed to the client, as explained in the registration procedure described above. The key file is then exported from the server's cryptographic module to a SSL 3.0 password secured web site 150. The customer can then change this password in a subsequent session.

The client authentication keys will have an expiration period. The duration of this period will be, for example three (3) years, as determined by the USPS Key Management Specification. To prevent checking for key renewal every time a client 2n connects to the server 4, all client keys may be set to expire at the same time. After a client 2n authenticates with the server 4, the server 4 will notify the client if its keys have expired. At that time, the client will generate a new set of keys and send the public key to the server. The server only stores the client's previous public authentication key. The private key is kept private with only the client. The public key is kept inside a password protected SQL master database 305 (FIGS. 4, 7) that is accessible only by the server cryptographic module 14. In the scenario when a user 2n requests a full refund, that user's keys are destroyed and their record removed from the SQL database 305.

Server Authentication Keys

The software product will execute a key generation routine. This routine will produce the server's public/private RSA 1024-bit authentication keys. The key will be stored on a secured SQL master database 305. The public/private keys will have an expiration period defined by the USPS. When the server's keys expire, it will regenerate a new pair of authentication keys. With every client record, a field will be used to indicate which version of the server public key its using. During authentication, the server 4 will retrieve the appropriate version of its authentication public key. If the client 2n is using an expired key, the server 4 will download the new key to the client 2n. The client's record will be modified to reflect the new key version. The server 4 will keep its old authentication keys archived for a specified period of time. This allows a client 2n who has not connected since the server's public key expired the ability to authenticate and download the server's current public key.

Certification Authority Certificate

The Certification Authority (CA)'s certificate is the only self-signed certificate on the system. The public key in the certificate corresponds to the private key used to sign the certificate. This makes the Certification Authority certificate easily susceptible to fraud if proper distribution mechanisms are not employed. The initial CA's certificate will be distributed by means of regular US certified mail. Included with the CA's certificate will be a hash of the next certificate key values. When a certificate expires, the USPS certification authority will issue a new certificate and sign it with the old certificates matching private key. The USPS CA will send a new certificate signed with the CA's new private key to the server 4. The server 4 will validate the certificate for authenticity by first checking to ensure that the new CA certificates public key authenticates the included signature. It will then hash the keys included with the new certificate to verify that the hash value match with the old hash included with the old CA's certificate. If both conditions validate, the old CA's certificate is deleted and replaced with a new CA certificate.

Client and Server Indicium Keys and Certificates

The client 2 and server 4 indicium keys are used to generate indicium 74 and all reside on the server 4. A client indicium key pair exists for every registered customer 2n while there is only one pair which exists for the server 4. All indicium key pairs are generated on the server 4. The private keys are immediately stored in the SQL master database 305, while the public keys are sent in a request to the Certification Authority of the USPS for certificate generation. The USPS will generate the certificates and send them to the server 4, which will verify the certificate's source and store it in a SQL master database 305.

The first step to indicium generation is generating a public/private key pair for the server 4. The public key is sent to the Certification Authority and a certificate for that server 4 is generated and returned to the Server. The Certification Authority also retains this certificate so that the Certification Authority can verify the authenticity of future server requests. Similarly, the server 4 will have copy of the CA's certificate to verify the authenticity of data being sent back from the CA.

The server 4 needs a public/private key pair for each client 2n in order to produce indicia. The server 4 will generate a key pair for the client 2n, store the private key in the secured SQL master database 305 and send the public key to the CA as a request. The request is signed with the server's private indicium key and sent to the CA, where the request will be authenticated using the server's certificate. The CA will send the certificate back to the server. The returned certificate will be packaged with some other information and digitally signed by the CA. Using the CA certificate the server 4 will verify the authenticity of this returned package.

Both the client 2n and the server 4 indicium keys will expire after specified period of time. Once it has been determined that indicium keys have expired, a new set of public/private keys will be generated and a new set of certificates will be requested. Because all indicium keys are located and managed by the server 4, the client 2 is not aware that its indicium keys have expired or been replaced. All old keys are permanently removed from the server.

Indicium Generation

The server cryptographic module 14 is responsible for completing the task of indicium generation. When an indicium generation request is passed to the cryptographic module 14 through one of its interfaces, the data included will be missing the client's indicium certificate and the PSD 20n register values. The cryptographic module 14 will retrieve the appropriate values from the SQL master database 305 and fill in the remaining values. The result is then signed with the client's private indicium key. The actual indicium 74 is the concatenation of data and the digital signature. Because of the presence of the client's certificate (which was signed by the USPS CA) the indicium 74 can be easily verified for authenticity by using the public key embedded in the client's 2 indicium certificate. The completed indicium 74 is returned back through the cryptographic module interface and ready to be sent to the client 2n. The data included in the indicium 74 can include, for example, the user 2n, the addressee of the recipient, the postage, the rate table used to calculate the postage, the date, time and preferred postal office/box/pickup location, etc.

Postal Security Devices (PSDs)

Figure 3:
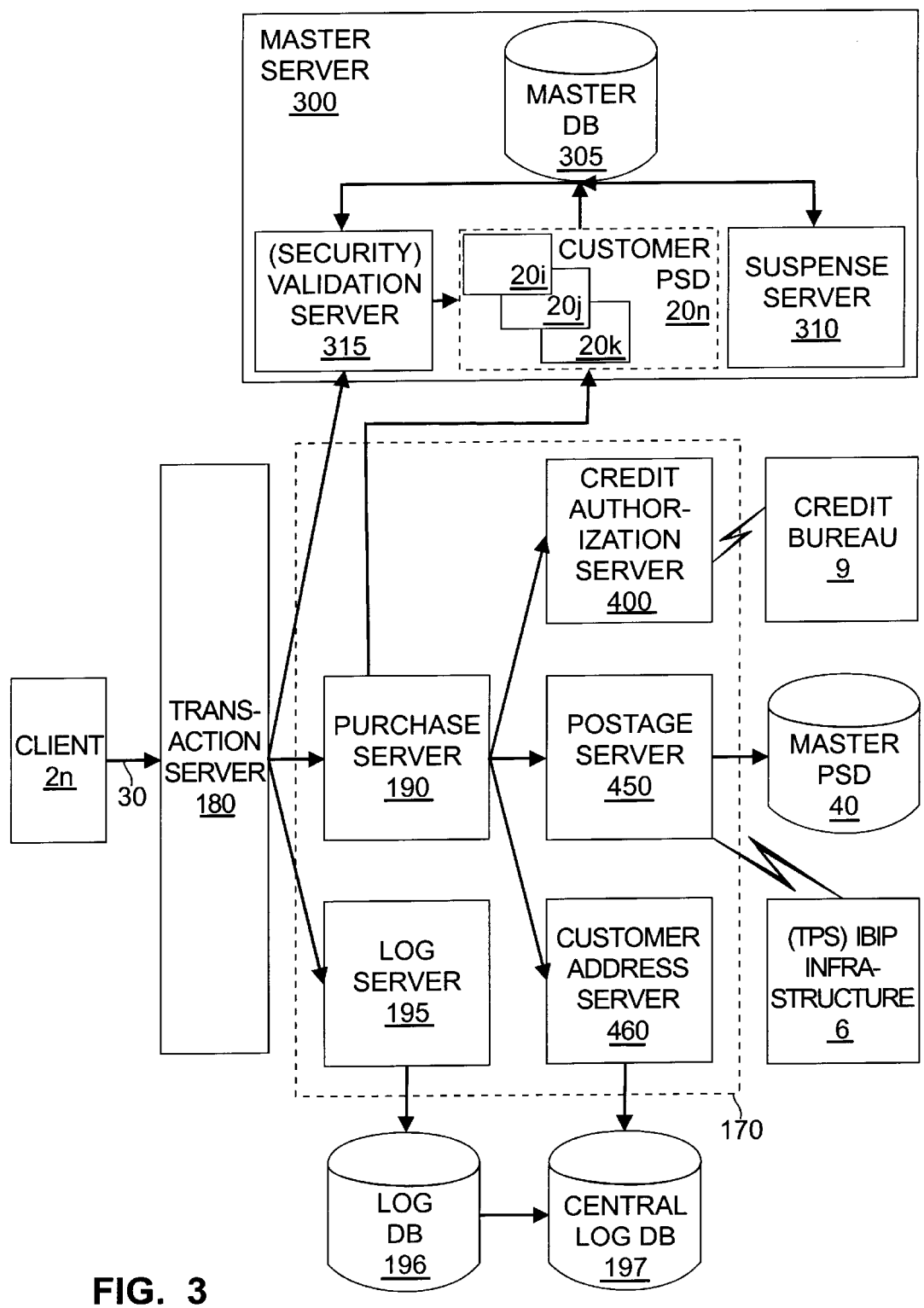
FIG. 3 is a block diagram of an embodiment of an RSP infrastructure of FIG. 1.

The PSDs 20n will actually reside on the secured SQL master database 305, although illustrated separately on FIG. 3. Each client 2n will have its own record representing its PSD 20n, while the server will have one master PSD 40.

A client PSD 20 record will contain four fields: Ascending Register 21, Descending Register 22, Maximum Descending Register 25 and Refund Register 24. The Ascending Register 21 measures a count of the total dollar value of postage a client 2n has ever spent. The Descending Register 22 measures a count of the current dollar value of postage that a client 2n has bought, but not used. The Maximum Descending Register 25 is a total dollar value that a client 2n is allowed to own at a particular time. The value of the Descending Register 22 can never be more than the Maximum Descending Register 25. The last field in the client PSD 20n is the Refind Register 24 which tracks the total dollar amount of postage that a client has had refunded.

The Master PSD 40, also resident on master database 315, contains three fields: Ascending Register 44, Descending Register 45, and Refund Register 46. The Ascending Register 44 measures the total dollar amount of postage that the server has sold to clients. The Descending Register 45 measures the total dollar amount of postage that the Server has to sell to clients. The Refund Register 46 measures the total dollar amounts of postage that server have refunded to clients.

The following graphical user interfaces are used in the server cryptographic module 14 for security.

PutNewCAX509 (Certificate [in], status [out]) This interface is used to replace the CA's X.509 certificate in the cryptographic module 14. A new certificate is passed into this interface and a status report is returned. The status will indicate if the certificate has been successfully changed. As part of this procedure, the cryptographic module will verify the authenticity of this new certificate.

CreateKeyFile (CutsomerID [in], KeyFile [out]) This interface is used to create the keyfile that the client 2n downloads from the registration web server 150.

Encrypt (PlainText [in], CipherText [out]) This interface will encrypt all the plaintext that it receives as an argument and outputs it in ciphertext. The cryptographic algorithm will be 64-bit RC2. The key used in this function remains inside of the cryptographic module, it is generated by the authentication routine.

Decrypt (SessionKey [in], CipherText [in], PlainText [out]) This interface will decrypt all the ciphertext that it receives as an argument and outputs it in plaintext. The cryptographic algorithm will be 64-bit RC2. The key used in this function remains inside of the cryptographic module, it is generated by the authentication routine.

CreateIndicium (IndiciumData [in], Indicium [out], status [out]) This interface allows for the creation of indicium 74. An incomplete indicium is sent into the cryptographic module 14, the module then performs cryptographic functions on the indicium 74 and returns it to the calling procedure.

Authenticate (OpenSocket [in], status [out]) The authentication interface will be called to verify and authenticate the identity of the client 2n. It is passed a handle to the current open socket of the client requesting a connection to the server. The status will indicate whether the client has successfully authenticated.

CreateIndiciumKeys (status [out]) This interface will be used to create new client key pairs used for indicium generation.

Add postage to Master PSD (Amount [in], status[out]) This interface will be used to add more postage to the Master PSD 40. The function will modify the appropriate registers to reflect any changes in how much postage the server 4 owns. The status will be used to indicate if the call was successful.

Add postage to Client PSD ( status [out]) This interface will be used to add more postage to the client PSD 20n. The function will modify the appropriate registers to reflect any changes in how much postage the client 2n owns. The status will be used to indicate if the call was successful.

GenerateServerAuthenticationKevs (status [out]) This will be an administrative function that will generate a new authentication key pair for the server 4. The status will indicate whether the function completed successfully.

StoreClientPublicKey (PublicKey [in], status [in]) This interface will allow the client's public authentication key to be updated in the cryptographic module's database. The status will indicate whether the function completed successfully.

RefundClientPSD (RefundAmount [in], status [out]) This interface will be used to reimburse postage to the client PSD 20n. The function will modify the appropriate registers to reflect any changes in how much postage the client owns. The status will be used to indicate if the call was successful.

Finite State Machine

Referring to FIG. 8 again, the finite state model defines the set of system access rules for the server cryptographic module 14. The model defines secured and unsecured states and all state transitions. When the software is executed, the cryptographic module 14 enters the Self-Test State 910. For example, the first test will verify that the executable module check-sums are correct. This will ensure that none of the code has been corrupted or modified. Next, the cryptographic algorithms will be tested. The RSA, RC2 and MD5 cryptographic algorithms will be tested using the "known-answer" test. A known value will be applied to the algorithm to determine if it will reproduce a known result. If the resulting value matches the expected result, the algorithm is assumed to be functioning properly. Since the DSA algorithm does not reproduce the same value twice, it will use pair-wise consistency test. This test will first sign a quantity with a private key and then verify the signature of this quantity using the public key. If the result of the verification is successful, the test succeeds. If any of cryptographic modules tests fail, it is assumed to be malfunctioning. If all self-tests pass successfully, the module proceeds to enter the Un-Initialized State 920, otherwise the module will enter into the Error State 950. No keys are loaded into the module during the Un-Initialized State and therefore no cryptographic functions can be performed. It is in this state that authentication service starts. Based on the authenticated user and the requested transaction, the cryptographic module will determine whether the next state should be the Key Entry State 960 or the Crypto-officer State 940. This decision will depend on whether the transaction will use the cryptographic module to perform key management or other cryptographic functions.

Because the transactions of multiple clients 2n will be handled simultaneously, the cryptographic module 14 will support a finite state machine that can be in the Idle State 970, Key Entry State 960, and Crypto-Officer State 940 at the same time. If key management functions are called, the module 14 enters the Crypto-officer State 940. In the Idle State 970, all cryptographic keys have been loaded into the module. The module is now initialized and remains idle until cryptographic functions are called. Once cryptographic functions are called the module moves into the User State 930. If a request is made to terminate the process, the module will clear all loaded keys from memory before transition to the Un-Initialized State 920. The User State 930 is used to perform all cryptographic functions, not related to key management, that are performed by the cryptographic module 14. As soon as a key-related function is complete, the module transitions back to the Idle State 970. If the cryptographic module 14 is not going to perform key management features it will be loaded with the keys of the current user. At that point, the module enters the Idle State 970 and remains there until either a cryptographic function is called or the process is ready to end. Keys will be created or modified and stored in the secured SQL database 305. The cryptographic module 14 will clear all key information from memory and transition back to Un-Initialized State 920. If cryptographic functions are requested from the Idle State 970, the module 14 enters the User State 930 to execute the requested cryptographic function. After the requested function is performed, the module re-enters the Idle State 970. In the Idle-State 970 or the Crypto-officer State 940, if the process is ready to end the module clears the keys and returns to the Un-Initialized State 920.

Each PSD 20n will have its own finite state machine as described above. Only during server 4 initialization and self-test will a single finite state machine be employed.

The Error State 950 indicates that an unrecoverable error has occurred. If the module enters the Error State 950, the module will no longer perform cryptographic functions. If keys are loaded into the module when the cryptographic module 14 enters the Error State, all keys will be cleared from the memory of the module.

In the Key Entry State 960 the cryptographic module 14 loads the keys obtained from SQL master database 305 for the authenticated user 2. The Initialize function of the Crypto-API library is used by the cryptographic module as a means of initializing the crypto-context with the keys. After successfully loading the keys, the module 14 moves to the Idle State 970.

The server cryptographic module 14 is preferably adapted to run on a Windows NT 4.0 platform. The client software typically has the ability to logon directly to the server 4. All communications between the client and the server are through TCP/IP sockets on a unique port 140 not used by the NT operating system. Although Windows NT v.4.0 is not considered C2 compliant with a Network Interface Card attached, the system will exercise very tight control over what enters the system through the card. All services or daemons will be removed from the operating system except for the single service needed to communicate between the client 2n and server 4 software. This service will be limited to a single TCP/IP port with a single interface 140 and access is controlled by the validation server 315 (FIG. 3).

Three NT accounts will be set up for the server processes to run under. The Transaction Manager and all Non-Cryptographic modules will run under the RSP User account 621. This account will have no access to the file system or the Secure SQL master database 305. The server cryptographic Module 14 will run under one of two accounts. A $CRYPTO_{13}$ User account 622 will be used to perform all non-key management cryptographic functions (e.g. encryption, decryption, and indicium generation). This user will have read only access to the Secure SQL master database 305. If key management is required, the cryptographic module will run under a CRYPTO_Officer account 623. This account will be able to create keys and will be able to insert, update, and delete keys from the Secure SQL Database.

In addition to the default NT security features, additional steps may be taken to ensure that the operating system meets the security requirements of the TPS 6 of goods and/or services, or the PSP 4 as the case may be appropriate.

For use with the USPS, the following steps may be taken, which are responsive to standards in effect as of November 1997, as they may be modified from time to time.

File Systems: All drive volumes on the Server will be converted to NTFS. This provides the discretionary access control required by the C2 standard of the USPS. Other Operating Systems: The C2 configuration requires that NT is the only operating system on the computer. The boot time-out on all servers will be set to 0. This allows Windows NT to start immediately without pausing for the user. Subsystems: Any OS/2 and POSIX subsystems are preferably removed. Security Logging: The C2 configuration requires that the security logs never overwrite events, regardless of their age. The security logs will be set so that they must be cleared manually by an administrator. Halt on Audit Failure: The C2 configuration requires that if events cannot be written to the security log, the system should be halted immediately. Password length: The C2 configuration requires that blank passwords not be permitted a minimum password length will be set that is >0. Guest Account: The C2 configuration requires that the default guest account installed by the setup program be disabled. The Guest account will be disabled on all servers. Power on Password: The C2 configuration requires that the system use a power on password. This system BIOS password will be set on all servers. Secure System Partition: For RISC (reduced instruction set computer)-based Windows NT systems, if RISC machines are used the administrator will secure the system partition.

Of course, it should be understood that other operating systems can be modified, created and/or designed that will comply with the C2 Requirements for use of the present invention in the postal systems of the described embodiment, or with other systems having similar security requirements.

Set forth below in Table IV is a table of the various security features used in the functions performed by Transaction Server 180.

phone number, etc. If any of the parameters within the user profile are modified, then the housekeeping service will in turn up-load the new user profile to the server.

The Ascending Register Log is a cumulative record of all postage purchases that have occurred since the initialization of the product.

The Descending Register Log is a record of the postage that currently resides on the user's system.

The Refund Register is used to keep track of the total postage amount refunded to the user.

All three registers: Ascending 22, descending 21, and Refund Registers 24 can be zeroized at any time because they exist in the server 4. Only after successful installation can the client purchase postage.

Housekeeping is an independent service which exists on the server 4 and handles all the indicium log updates, user profile updates, rate table updates and new software updates as necessary.

TABLE IV

| | | | Security | | |
|---|---|---|---|---|---|
| Transaction | Security | Audit Control | | Cash Mgt. | Compliance |
| Registration | SSL3.0<br>RC2<br>MD5 | Creation of Customer Record<br>Store X.509, Key Pair, License ID | | | CMLS License Request |
| Acquisition<br>(Download) | SSL3.0 | | | | |
| Purchase | RSA Authentication<br>Integrity (Hash)<br>RC2 Encryption<br>Session Key | Log Purchase Request<br>Log Prior/Current Register States | | Transfer of funds to USPS<br>banking authority<br>Add to individual descending<br>register<br>Deduct from master<br>descending register | Daily Log File Upload to CMRS |
| Refund | RSA Authentication<br>Integrity (Hash)<br>RC2 Encryption<br>Session Key | Log Refund Request<br>Log Prior/Current Register States | | Add to individual descending<br>register<br>Deduct from master<br>descending register | Daily Log File Upload to CMRS |
| Printing | RSA Authentication<br>Integrity (Hash)<br>RC2 Encryption<br>Session Key | Log Indicia(um)<br>Log Prior/Current Register States | | Deduct from individual<br>descending register | Indicia Log available |
| Cleansing | RSA Authentication<br>Integrity (Hash)<br>RC2 Encryption<br>Session Key | Log Addresses | | | Address Log available |
| Address Change | RSA Authentication<br>Integrity (Hash)<br>RC2 Encryption<br>Session Key | Log Prior/Current Addresses | | | Daily Log File Upload<br>to MATS/NMATS<br>Submit update request to CMLS |
| Software Change | SSL3.0 | Store prior software<br>version off-line | | | |
| Postage Rate<br>Update | SSL3.0 | | | | | c. Auditing & Reporting

An auditing and reporting feature is an amalgam of various other features contained within the system. The server 4 automatically records various data and stores them on the log server 195. Items stored include the User Profile Log and the Indicium Log, which are maintained in databases 196 and 197. In addition, the master server 300 contains individual PSD 20n that contain the Ascending Register 22, the Descending Register 21, and the Refind Register 24. In terms of security functions, server 4 is event dependent. It is event dependent in that the server has event-driven requirements of the user (e.g., when an indicium 24 is created, it is logged).

Figure 4B:
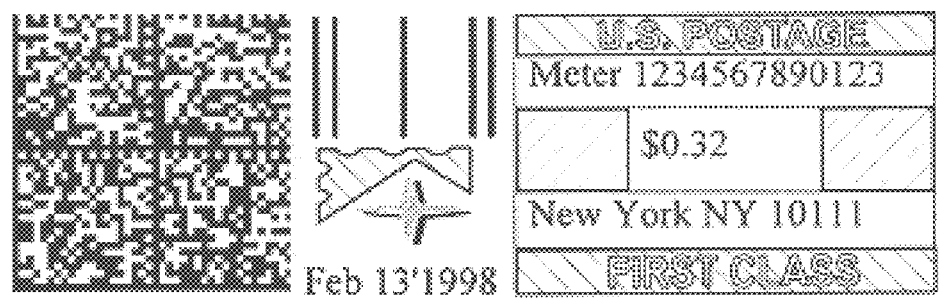

The Indicium Log contains all information represented in the computer- and human-readable portions of the indicium 74. The 11 digits of the ZIP+4+2 are located in the Special Purpose Field of the two-dimensional bar code 76 (FIG. 4).

The User Profile Log contains a record of the information specific to the current user 2n, such as the mailing address, On the client 2 side, after the Transaction Service successfully receives the Handshake Response Object, it sends the following housekeeping request to the server 4: New rate table request and New software request.

d. Symbology

The present invention supports the implementation of the Data Matrix brand two-dimensional matrix or bar-coding technology for use in indicium 74. Among the numerous reasons for this support are the Data Matrix code has a smaller footprint and is perceived as aesthetically more pleasing than the well known PDF417 code; Data Matrix easily supports the proposed 15 mil x-dimension requirement of the USPS; Data Matrix supports scanning by a CCD device, rather than a laser scanner, and Data Matrix Code is easily read regardless of scanner orientation.

It should be noted that the system can implement the use of Wallace Software libraries that support the creation of both Data Matrix and PDF4 17 two-dimensional bar-codes 76. The Indicia Service will initiate the creation of a bar code by executing the barcode software and indicating the data to be converted. Other two dimensional code symbologies also could be used.

e. Authorized AdvertisingArt

With reference to FIGS. 4A and B, the authorized advertising art feature allows the user to place a United States Postal Service approved graphic image 77 on the envelope next to or more particularly as a part of the indicium 74. It is initiated by pressing an associated radio button for selecting or deselecting a United States Postal Service authorized graphic, a file selection field, and a bitmap display field for viewing each graphic. The feature allows the user to select or deselect an authorized graphics file for placement on some or all mail pieces.

f. Display Graphic

A display graphic feature may be provided which allows the user to place a graphic image or text on the envelope next to the indicium 74. It is initiated by pressing an appropriate radio button and allows the user to select a specific graphics file, or enter text, for placement on all mail pieces. The display preferably contains three (3) radio buttons: Graphic, Text, and None. The default selection is Graphic. If Graphic is selected then the file selection area is activated. Any bitmap image may be used, once approved by the United States Postal Service. If Text is selected then the file selection area is deactivated and the text entry area is activated. The font for all text is pre-set to Arial 11 pt. The customer must create their own graphics to produce any other type size or style. Selecting None will remove any previously entered graphics or text. Pressing OK will process the selection and return to the Page Setup screen. Pressing Cancel will return to the Page Setup Screen without selecting a file.

g. Audits

The Audit Function required by the United States Postal Service can be satisfied by various functions of the system working synergistically under the control of Housekeeping Services. The Housekeeping service is responsible for up-loading configuration changes and new logs to the server 4. It also facilitates downloading of new client software and pricing changes from the server 4 to the client 2. This service is preferably called every time the user 2n connects to the server 4 and is called upon immediately after the Authentication procedure.

The user profile will contain information specific to the current user 2n, such as the mailing address, phone number, and any other information required on PS Form 3601-A and the information returned on PS Form 3601-B. If any of the parameters within the user profile are modified, then the housekeeping service will in turn up-load the new user profile to the server.

h. Communications andMessages Interfaces with Postal Infrastructure

On a periodic basis (e.g., 12:00 midnight every day) the server 4 system can run an agent that reviews all log database tables that have changed during the prior 24-hour period. Any changes that have been made are analyzed and matched to the customer record found in the Master Database 305. Purchase, spoilage, and refund information will be marked for a batch transmission to TPS 6.

Data supplied to TPS 6 about such periodic (daily) activity are kept in the Log and Master databases 196, 197 and 305. The two tables used are PSD and Log. All data in these tables are available for review by the USPS as ad-hoc reports.

The records of the various transactions are stored on logs on the server 4. The records of the postage downloads from TPS 6 to are sent to USPS Treasury daily as part of a daily reconciliation. The records of all other financial transactions are sent to TPS 6 (NMATS) each morning. If, for example, $100 in postage were downloaded from TPS 6 USPS to server 4 and server 4 subsequently sold $25 each to users 2i, 2j, and 2k, the logs would indicate the following transactions:

1. $100 from TPS 6 to server 4 postage pool
2. $25 from pool to user 2i
3. $25 from pool to user 2j
4. $25 from pool to user 2k i. Communications and message interfaces with TPS 6 financial institutions

The server 4 notifies the TPS 6 (United States Postal Service financial institution (FDMS)) of all credit card transactions. Credit card and ACH debit card postage download purchases are transacted in real time and stored in log 196, 197 on the server 4. These logs are transmitted to USPS at the appropriate time and in an agreed upon format. The Daily Record of Transactions is forwarded to NMATS every morning and the Daily Account Reconciliation is forwarded to the Treasury each day as well. Postage value downloads purchased by check are recorded by the Transaction Service and forwarded to the Treasury and NMATS as part of the above-mentioned file transmissions.

It should be understood that the present invention is applicable to third party sellers of goods and/or services other than the USPS, where electronic transactions are used by the user/customer to pay for the goods and/or services. Indeed, the present invention is applicable to situations in which the remote service provider 4 also is the third party seller of the goods or services, as contrasted with a brokering or sales agent as in the case of the preferred embodiment described in detail above. Such examples include, without limitations, other package/mail carriers or shipping services, such as Federal Express, UPS, Airborne, Purolator, Roadway, and the like, Postal Services of other countries, tax stamp issuing authorities for state, federal and other governmental agencies, stock certificate issuing entities, and ticket issuing entities (such as tickets for live and movie theatres, sporting events, concerts, travel/transportation such as air, boat, train, bus, subway and the like). In each of these cases, a unique indicium, postal or otherwise, can be generated by the RPS 4, digitally signed by the true customer, downloaded to the customer and printed as a "receipt" locally by the customer who has electronically paid for the purchase via the Internet. The indicium can be scanned at the point of consumption, e.g., when the package enters the mailstream or the shipping company system, or the customer enters the facility where the sporting event or concert occurs. Because each receipt is unique, a duplicate (and thus a fraudulently obtained copy) can be easily detected and the legitimate version identified, and the offender caught and punished as appropriate. The ease of scanning in and the speed of decoding the two dimensional matrix codes or bar codes incorporated into the indicium, postal or otherwise, renders the process essentially transparent to the customer.

One skilled in the art will appreciate that the present invention can be practiced by other than the described embodiments, which are presented for purposes of illustration and not of limitation.

We claim:

1. A system for conducting Internet based financial transactions comprising:

a client having a processor, a printer, a client authentication module, a module for issuing a transaction request, and a unique digital signature;

a server having a network including a transaction server, a transaction database, a server authentication module, and a receipt generation module; and an internet connection between the client and the server network;

wherein the transaction execution system further comprises:

an authentication module, wherein the client authentication module and the server authentication modules communicate via the internet connection and are authenticated to each other;

a transaction module wherein, in response to the client and server being authenticated, the client issues a transaction request to the server and the transaction server, in response to a client transaction request, executes an electronic payment transaction at the server and records the transaction in the transaction database, and wherein the server receipt generation module, in response to an executed electronic payment, generates a receipt and transmits said receipt to the client, said receipt comprising the client digital signature and a data set uniquely identifying the executed transaction; and wherein the receipt is printable by the client printer and the printed receipt is an evidence of payment for the executed transaction.

2. The system of claim 1 wherein the module for issuing a transaction request further comprises means for providing the transaction request with the client digital signature.

3. The system of claim 2 wherein the server further comprises a unique digital signature and the receipt further comprises the server digital signature.

4. The system of claim 1 wherein the server further comprises a first server, a firewall and a single TCP/IP port, the first server is connected to the interact connection, the firewall is interposed between the server first server and transaction server so that the transaction server is connected to the network through the single TCP/IP port and the firewall comprises a communication module that operates to limit communications between the internet and the transaction server to client transaction requests identifying the single TCP/IP port.

5. The system of claim 1 further comprising:

a third party seller having a processor and a database; and a communication channel between the third party seller and the server, wherein the client further comprises a registration certificate representative of being a consumer registered with said third party seller.

6. The system of claim 5 further comprising a transaction module wherein said third party seller database is updated by said server transaction database.

7. The system of claim 1 further comprising a third party credit facility and a communication link between the third party credit facility and the server, wherein the server further comprises a credit module wherein, in response to a client transaction request, a credit card payment request is made by the server to the third party credit facility, the third party credit facility authorizes the credit card payment and issues an authorization code to the server, and the server transaction database is updated.

8. The system of claim 1 wherein the transaction request further comprises a request to purchase an amount of postage, an addressee data set, and wherein the server transaction database further comprises a pool of postage prepaid by said server, and an account register associated with said client, wherein the client transaction request operates to transfer the requested amount of postage from said pool to said client account register.

9. The system of claim 1 wherein the client further comprises a client public key, a client private key, and a client identification password, a hash module for performing a hash algorithm based on an input data, a hash of at least one of the client public key, private key and identification password, and an encryption/decryption module for encrypting and decrypting at least one of the client private key and client public key based on said hash; wherein the server further comprises a server public key, a server private key, and a server identification password, a hash module for performing a hash algorithm based on an input data, a hash of at least one of the server public key, private key and identification password, and an encryption/decryption module for encrypting and decrypting at least one of the server private key and server public key based on said hash; and wherein said authentication module utilizes said public and private keys of said client and server to perform the authentication.

10. A method for conducting Internet based financial transactions comprising:

providing a client having a processor, a printer, a client authentication module, a module for issuing a transaction request, and a unique digital signature;

providing a server having a network including a transaction server, a transaction database, a server authentication module, and a receipt generation module;

connecting the client to the server network via an internet connection;

authenticating the client and the server to each other;

issuing a transaction request from the client to the server;

in response to a client transaction request, executing an electronic payment transaction at the transaction server and recording the transaction in the transaction database, generating a receipt at the server receipt generation module, providing said receipt with the client digital signature and a data set uniquely identifying the executed transaction, and transmitting said receipt to the client; and printing said receipt using the client printer, wherein the printed receipt is an evidence of payment for the executed transaction.

11. The method of claim 10 wherein issuing a transaction request further comprises providing the transaction request with the client digital signature.

12. The method of claim 11 further comprising providing the server with a unique digital signature and providing the receipt further comprises providing the server digital signature as a part of the receipt.

13. The method of claim 10 wherein providing the server further comprises providing a single TCP/IP port connecting the first server to the internet connection with said client and limiting communications between the internet and the transaction server to client transaction requests identifying the single TCP/IP port.

14. The method of claim 10 further comprising providing a third party seller, connecting the third party seller and the server via a communication channel and providing the client with a registration certificate representative of being a consumer registered with said third party seller.

15. The method of claim 14 further comprising providing the third party seller with a transaction database and updating said third party seller transaction database by said server.

16. The method of claim 10 further comprising providing a third party credit facility, connecting the third party credit facility and the server via a communication link and in response to a client transaction request, issuing a credit card payment request by the server to the third party credit facility, authorizing the credit card payment by the third party credit facility and issuing an authorization code to the server, and updating the server transaction database.

17. The system of claim 10 wherein issuing the transaction request further comprises issuing a request to purchase an amount of postage, an addressee data set, and wherein the server transaction database further comprises a pool of postage prepaid by said server, and an account register associated with said client, wherein issuing the client transaction request further comprises transferring the requested amount of postage from said pool to said client account register.

18. The system of claim 10 wherein authenticating the client and the server further comprises providing the client with a client public key, a client private key, a client identification password, a hash module for performing a hash algorithm based on an input data, a hash of at least one of the client public key, private key and identification password, and an encryption/decryption module for encrypting and decrypting at least one of the client private key and client public key based on said hash; providing the server a server public key, a server private key, a server identification password, a hash module for performing a hash algorithm based on an input data, a hash of at least one of the server public key, private key and identification password, and an encryption/decryption module for encrypting and decrypting at least one of the server private key and server public key based on said hash; and using said public and private keys of said client and server to perform the authentication.

* * * * *